US012596564B2

(12) United States Patent
Wilson et al.

(10) Patent No.: US 12,596,564 B2
(45) Date of Patent: Apr. 7, 2026

(54) PRE-LOADING SOFTWARE APPLICATIONS IN A CLOUD COMPUTING ENVIRONMENT

(71) Applicant: NVIDIA Corporation, Santa Clara, CA (US)

(72) Inventors: David Wilson, Liberty Hill, TX (US); Kevin Klemmick, Saratoga, CA (US); David Le Tacon, Jonestown, TX (US); Andres Valencia, San Jose, CA (US); Bojan Vukojevic, Pleasanton, CA (US); Sergey Aleksandrovich Tarasov, Moscow (RU); Yury Taradzei, Sunnyvale, CA (US); Yury Nikolaevich Zararin, Moscow (RU); Khurrum Islam, San Jose, CA (US); Grigory Mikhailovich Trifonov, Moscow (RU)

(73) Assignee: NVIDIA Corporation, Santa Clara, CA (US)

( * ) Notice: Subject to any disclaimer, the term of this patent is extended or adjusted under 35 U.S.C. 154(b) by 570 days.

(21) Appl. No.: 17/926,059

(22) PCT Filed: Feb. 18, 2022

(86) PCT No.: PCT/RU2022/000044
§ 371 (c)(1),
(2) Date: Nov. 17, 2022

(87) PCT Pub. No.: WO2023/158332
PCT Pub. Date: Aug. 24, 2023

(65) Prior Publication Data
US 2023/0367620 A1 Nov. 16, 2023

(51) Int. Cl.
*G06F 9/455* (2018.01)
*G06F 9/445* (2018.01)

(52) U.S. Cl.
CPC ...... *G06F 9/45558* (2013.01); *G06F 9/44521* (2013.01); *G06F 2009/45575* (2013.01); *G06F 2009/45595* (2013.01)

(58) Field of Classification Search
CPC ............. G06F 9/45558; G06F 9/44521; G06F 2009/45575; G06F 2009/45595;
(Continued)

(56) References Cited

U.S. PATENT DOCUMENTS 8,656,297 B2 2/2014 Koenig et al.
10,261,938 B1 * 4/2019 Jenkins .............. G06F 16/9574
(Continued)

*Primary Examiner* — Dong U Kim
(74) *Attorney, Agent, or Firm* — Lowenstein Sandler LLP

(57) ABSTRACT
Apparatuses, systems, and techniques for pre-loading a software application in a cloud computing environment. A method can include sending a pre-load request to pre-load a first portion of data for an application hosted at an application hosting platform, the pre-load request being received before receiving user input identifying the application for execution. The method can include receiving a first indication that the first portion of data is pre-loaded and receiving a user request to execute the application. The method can further include sending a load request to load a second portion of data for the application, receiving a second indication that the second portion of data is loaded for the application, and causing the application to execute at the virtualized computing environment in response to receiving the second indication.

21 Claims, 16 Drawing Sheets

(58) Field of Classification Search
CPC .... G06F 9/445; G06F 9/44578; G06F 9/4403; G06F 9/45504; G06F 9/5072; G06F 2009/4557; G06N 3/09; G06N 20/00
See application file for complete search history.

(56) References Cited

U.S. PATENT DOCUMENTS

| | | | |
|---|---|---|---|
| 10,706,187 B1 * | 7/2020 | Ehrlund | G06F 30/20 |
| 11,449,777 B1 * | 9/2022 | Sathe | G06F 9/45558 |
| 12,190,144 B1 * | 1/2025 | Featonby | H04L 67/568 |
| 2014/0337862 A1 * | 11/2014 | Valencia | G06F 21/45 |
| | | | 719/313 |
| 2015/0106805 A1 * | 4/2015 | Melander | G06F 9/5077 |
| | | | 718/1 |
| 2017/0048319 A1 | 2/2017 | Straub | |
| 2017/0147243 A1 | 5/2017 | Kowalski et al. | |
| 2017/0255491 A1 * | 9/2017 | Bradshaw | G06F 9/5061 |
| 2018/0097905 A1 * | 4/2018 | Todasco | H04L 67/02 |
| 2018/0293087 A1 * | 10/2018 | Lee | G06F 9/445 |
| 2019/0138919 A1 * | 5/2019 | Chen | G06F 9/445 |
| 2019/0347107 A1 * | 11/2019 | Ma | G06N 3/045 |
| 2020/0151621 A1 * | 5/2020 | Garcia Delgado | G06N 20/00 |
| 2020/0306632 A1 * | 10/2020 | Kolen | A63F 13/79 |
| 2020/0351345 A1 | 11/2020 | Bansod et al. | |
| 2020/0391118 A1 * | 12/2020 | Kerr | G06N 3/0464 |
| 2021/0368023 A1 * | 11/2021 | Yan | H04L 67/34 |
| 2022/0197762 A1 * | 6/2022 | Chopra | G06F 11/2025 |
| 2022/0405635 A1 * | 12/2022 | Zhang | G06Q 10/04 |
| 2023/0281021 A1 * | 9/2023 | Jung | G06F 9/445 |
| | | | 715/761 |

* cited by examiner

100

700

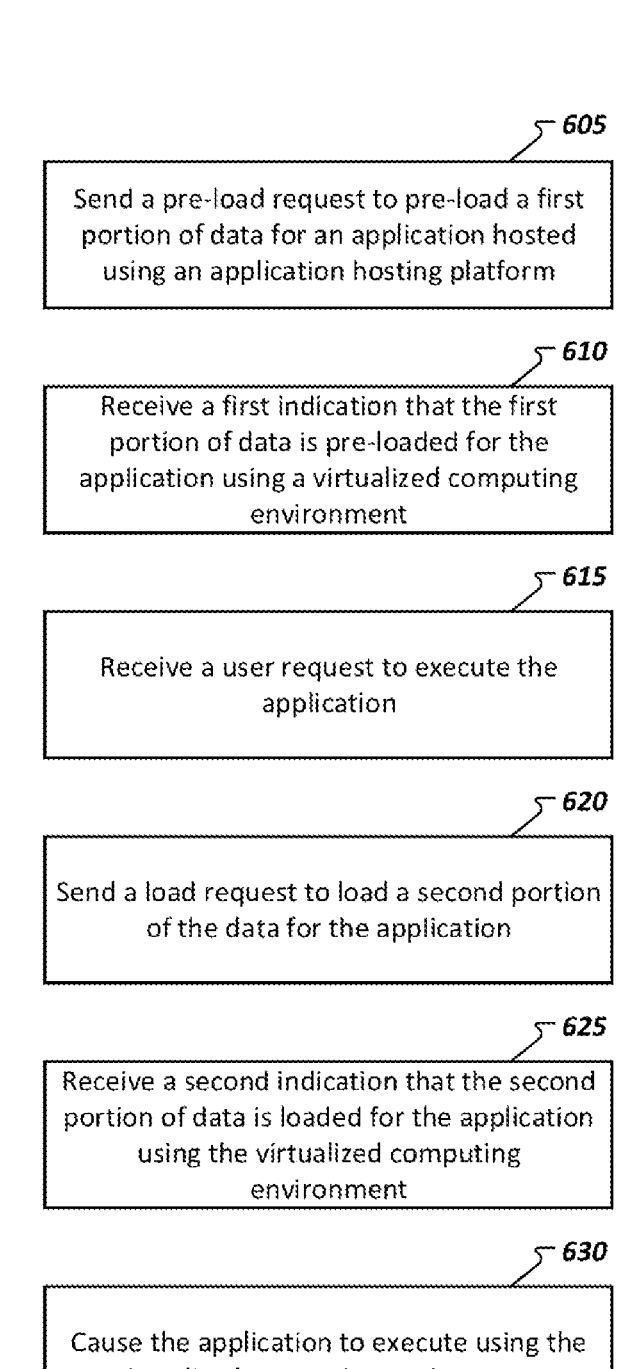

605

Send a pre-load request to pre-load a first portion of data for an application hosted using an application hosting platform

610

Receive a first indication that the first portion of data is pre-loaded for the application using a virtualized computing environment

615

Receive a user request to execute the application

620

Send a load request to load a second portion of the data for the application

625

Receive a second indication that the second portion of data is loaded for the application using the virtualized computing environment

630

Cause the application to execute using the virtualized computing environment

FIG. 6

800
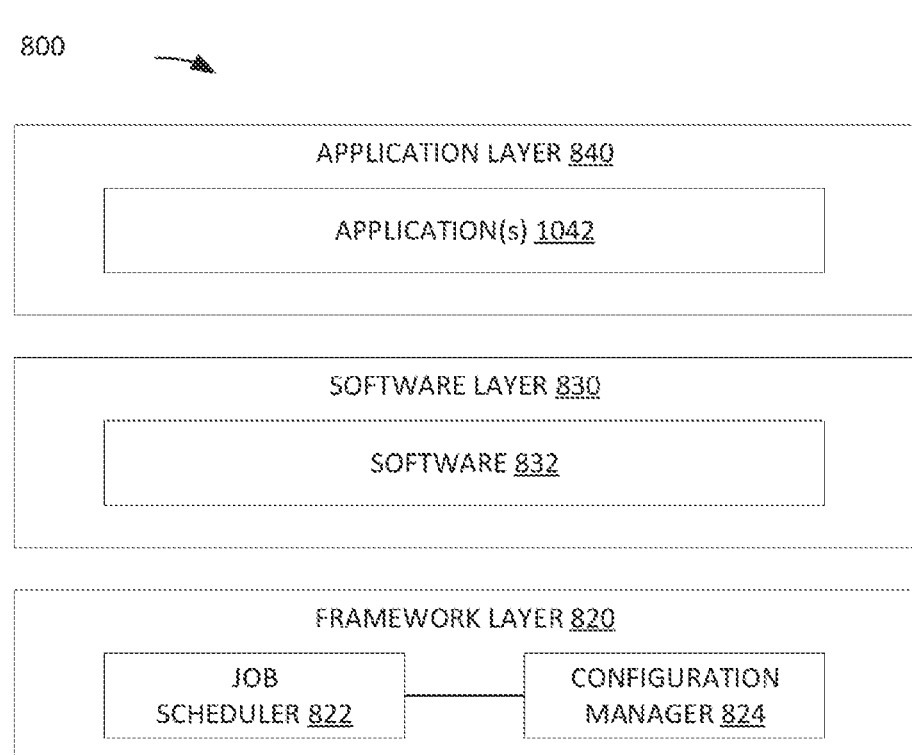
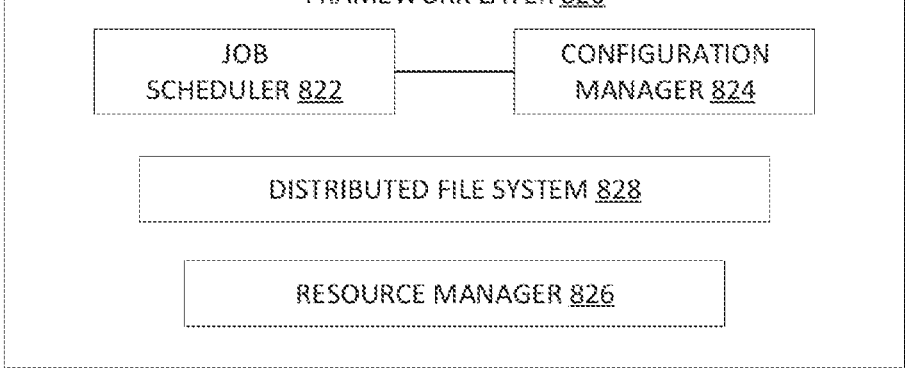
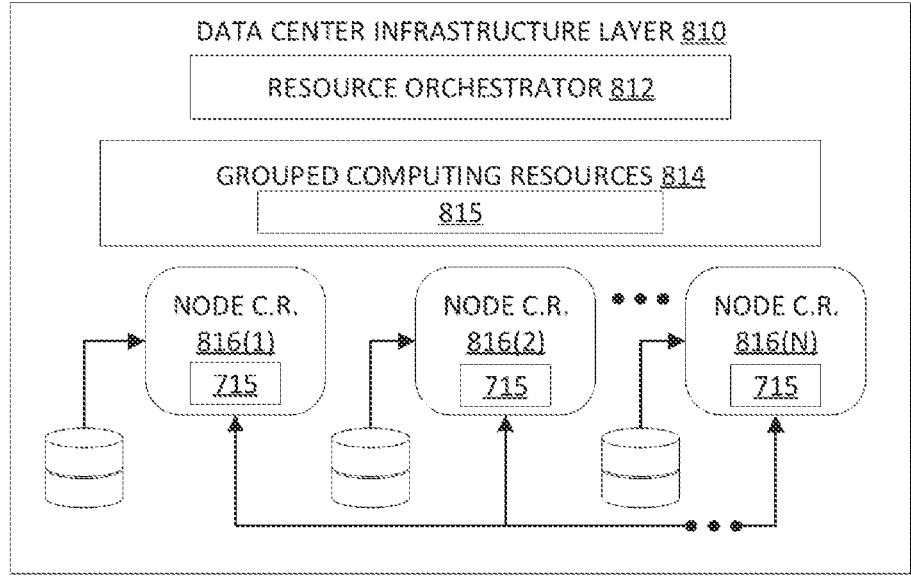
FIG. 8

PRE-LOADING SOFTWARE APPLICATIONS IN A CLOUD COMPUTING ENVIRONMENT

TECHNICAL FIELD

At least one embodiment pertains to processing resources used to perform and facilitate pre-loading of applications in a cloud computing environment. For example, at least one embodiment pertains to processors or computing systems used to provide and enable a gaming application to pre-load at one or more virtualized computing environments hosted by an application hosting platform, according to various novel techniques described herein.

BACKGROUND

In a cloud computing environment, the user can access and stream software applications (such as gaming applications) via an application hosting platform at their local client device. The software application can load several files during a launch sequence, including assets, textures, graphics, data associated with the user, etc. Loading all of the files associated with the software application can take a significant amount of time. An application hosting platform can load the software application once a user accesses an instance of the software application. However, such existing techniques can cause users to wait a significant amount of time before the software application is ready for streaming. This can reduce the overall user experience.

BRIEF DESCRIPTION OF DRAWINGS

Various embodiments in accordance with the present disclosure will be described with reference to the drawings, in which:

FIG. 1B illustrates a block diagram of another example system architecture, in accordance with at least some embodiments.

FIG. 6 illustrates a flow diagram of an example method of pre-loading a software application, in accordance with at least some embodiments.

FIG. 8 illustrates an example data center system, in accordance with at least some embodiments.

DETAILED DESCRIPTION

Figure 1:
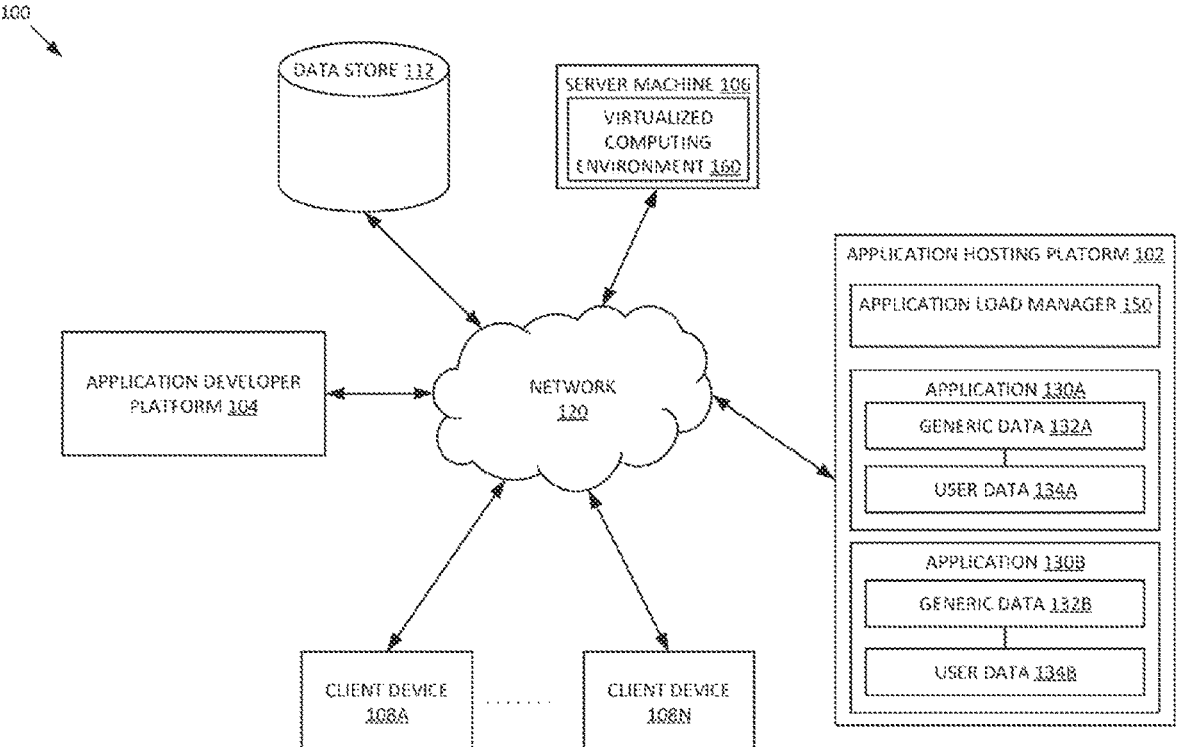
FIG. 1 illustrates a block diagram of an example cloud computing environment system architecture, in accordance with at least some embodiments.

Software applications may be hosted on a cloud computing environment by, for example and without limitation, an application hosting platform. For example, an instance of a software application hosted by the application hosting platform can run on a client device via a virtualized computing environment (e.g., on a virtual machine or container). A user can access the software application (e.g., video game or mobile game) on a computing device (e.g., computer, gaming console, mobile phone, smart phone, etc.) via the application hosting platform. For example, a user can access (e.g., log into) the application hosting platform and select a gaming application to run or play on their computing device. The application hosting platform can communicate with the gaming application through a set of application programming interfaces (APIs) and begin to load an instance of the gaming application to a virtualized computing environment for the user device to access. For example, the application hosting platform can launch the gaming application to the virtualized computing environment using a command line interface (CLI) command when the user selects the gaming application. To launch the gaming application at the virtualized computing environment, the application hosting platform can begin to load the gaming application files for the user at the virtualized computing environment. In some examples, this can include generic gaming application data and user gaming application data. For example, generic data of the gaming application can include assets, textures, artwork of the gaming application, background graphics, title screens, main menu screens, memory allocation of the gaming application on the user device, shaders, etc. User data can include data the gaming application loads specifically for the user. For example, user data can include specific user settings (e.g., resolution or shader settings), custom user content (e.g., customizations to a character in a game made by the user), custom key bindings, etc.

In some examples, the application hosting platform can take several minutes to load the generic and user data to the virtualized computing environment. Specifically, the application hosting platform can take several minutes loading the generic data—e.g., if most of the data loaded by the application hosting platform from the gaming application is generic data. During this time, the user is unable to access the gaming application and is forced to wait. In some examples, the user may see a loading screen while the virtualized computing environment is getting ready for play. Once initialized, the virtualized computing environment can be ready and the user can access the gaming application and main menu. The overall user experience of running an instance of the gaming application can be negatively impacted due to the long delay between the user selecting the gaming application and the user being able to access the gaming application. For example, the experience may be negatively impacted when the user must wait for an excessive duration of time until the virtualized computing environment completes initializing and loading the generic and user data sufficiently before the game can be played.

Aspects of the present disclosure address the above and other deficiencies by enabling an application hosting platform to prepare (e.g., pre-load at least some portions) a virtualized computing environment (e.g., a virtual machine or container) for running an instance of a software application and reduce a time between selecting the instance of the software application and running the instance of the software application for a user. That is, the application hosting platform can have the instance of the software application at least partially loaded (using a pre-load mode) when the user selects the instance of the software application—e.g., the virtualized computing environment is partially loaded with the generic data of the software application when the user selects the software to run. For example, the software application can send the application hosting platform an initialization request via a first application programming interface (API) command. The initialization request can notify the application hosting platform whether the software application should be instructed to launch in a pre-load mode using a CLI command or a flag setting (e.g., in a configuration file of the application). Alternatively or in addition, the software application should be instructed to launch in a pre-load mode by confirming that the software application is present in the cloud environment.

The application hosting platform can then request that generic data for an instance of the software application be loaded to the virtualized computing environment. In response to the confirmation, the software application can begin loading generic data to the virtualized computing environment for the instance of the software application. For example, the virtualized computing environment can be loaded with textures, shaders, background graphics, etc. after receiving the confirmation—e.g., load everything exclusive of the user data. Each software application can have varying amounts of generic data to load—e.g., the generic data can be specific to a respective software application. In some examples, after loading the generic data, the software application can notify the application hosting platform the generic data is finished loading. In some examples, the application hosting platform can utilize a machine learning model to predict when a specific software application will finish loading the generic data. When the application hosting platform receives the notification the software application is finished loading the generic data, the application hosting platform can cause the virtualized computing environment to be placed into an idle mode. That is, the virtualized computing environment can be ready for a user to access while consuming minimal computing resources.

When a user selects the instance of the software application, a virtualized computing environment service can notify the application hosting platform of the user initializing a session. The application hosting platform can communicate with the application via an API command (e.g., a session call back) and indicate to the software application to load user data. Accordingly, the virtualized computing environment can be loaded with the user data and can be ready for the user to start running the software application. The application hosting platform can request to pre-load several virtualized computing environments for a specific software application based on collected data. For example, the application hosting platform can determine an average duration a virtualized computing environment stays idle as well as how many users cannot access a pre-loaded virtualized computing environment—e.g., there are not enough pre-loaded virtualized computing environments for users of the software application. Accordingly, based on the balance between the amount of time a virtualized computing environment is idle and how many users cannot access a pre-loaded virtualized computing environment, the application hosting system can instruct to prepare a specific amount of virtualized computing environments for a software (e.g., gaming, content creation, etc.) application. Additionally, the application hosting platform can instruct to deconstruct a virtualized computing environment if the software application undergoes an update e.g., by deleting a virtual machine and pre-loading another virtual machine (or replacing stored generic data on the virtual machine) with updated generic data from the updated software application.

Because the generic data was already loaded to the virtualized computing environment, the amount of time the user has to wait between initiating the software application and running the software application is reduced. For example, the user can access the main menu and start the software application after the user data is loaded, rather than having to wait for the generic data and the user data to load. This can improve the overall user experience and provide for more balanced use of network bandwidth and computing resources.

FIG. 1 illustrates a block diagram of an example system architecture 100, according to at least one embodiment. The system architecture 100 (also referred to as "system" herein) includes application hosting platform 102, application developer platform 104, server machine 106, client devices 108A-N (collectively and individually referred to as client device(s) 108), and data store 112, each connected to a network 120. In implementations, network 120 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 112 is a persistent storage that is capable of storing content items as well as data structures to tag, organize, and index the content items. Data store 112 may be hosted by one or more storage devices, such as main memory, magnetic or optical storage based disks, tapes or hard drives, NAS, SAN, and so forth. In some implementations, data store 112 may be a network-attached file server, while in other embodiments data store 112 may be some other type of persistent storage such as an object-oriented database, a relational database, and so forth, that may be hosted by platform 102 or one or more different machines coupled to the platform 102 via network 120.

Application hosting platform 102 may be configured to host files of one or more applications (e.g., application 130A, application 130B, etc.) provided by an application developer (e.g., via application developer platform 104). Application developer platform 104 may be used by an application developer (e.g., a user, company, organization, etc.). For example, an application developer may be a video game developer that develops a video game (represented by an application 130) for users to interact with on client devices 108. Application hosting platform 102 may provide users with access to an application 130 (or an instance of an application 130) provided by application developer platform 104 via a respective client device 108A-N. For example, application hosting platform 102 may allow users to consume, upload, download, and/or search for applications 130. In some embodiments, application hosting platform 102 may have a website (e.g., one or more webpages) or a client application or component that may be used to provide users with access to applications 130. In some embodiments, each application 130 may consist of generic data 132 (e.g., data exclusive of user data) and user data 134—e.g., generic data 132A and user data 134A of application 130A, generic data 132B and user data 134B of application 130B, etc. In at least one embodiment, the application hosting platform 102 can be an example of a cloud-hosted gaming service platform, a cloud-hosted collaborative content creation platform for heterogeneous content creation applications, a video streaming hosting platform, a testing platform for simulated or augmented content, a machine learning training platform, a machine learning deployment platform, or a video conferencing hosting platform. In at least one embodiment, the application 130 (or instance of application 130) can be an example of a gaming application, a video conferencing application, a content creation application, a cloud-hosted application, a collaborative content creation application, a cloud-hosted collaborative content creation application, a video streaming application, a machine learning application, or a simulation application.

In some embodiments, server 106 may host a virtualized computing environment 160 running an instance of application 130. For example, server 106 may be a computer system that includes one or more physical devices (e.g., a processing device (e.g., a GPU), memory, one or more I/O devices, etc.) and a hypervisor and/or a host operating system that manage one or more virtualized computing environments 160. A virtualized computing environment 160 may correspond, for example, to a virtual machine running a guest operating system and one or more guest applications including an instance of application 130, or a container running an application such as an instance of application 130. One or more servers 106 may be provided and each server 106 may host one or more virtualized computing environments 160. In some embodiments, each server 106 may correspond to computer system 900 and/or computer system 1000 described with respect to FIGS. 9 and 10.

Application hosting platform 102 may include an application load manager 150 that enables staged loading of application data (generic data 132A and user data 134A) into virtualized computing environment 160 to reduce the time between selection of application 130A or 130B and execution of an instance of application 130A or 130B for a user, as discussed in more detail herein. At least some of generic data 132A and user data 134A can be displayed via a user interface (UI) on each client device accessing an instance of a respective application 130. The amount of generic data 132 and user data 134 can be defined for application 130 by an application developer via application developer platform 104. A user of the respective client device 108 may interact with the instance of the application 130 by engaging, via a GUI provided by the application hosting platform 102, with an instance of the application 130 loaded with the generic data 132 and user data 134. The GUI of the application hosting platform 102 may be presented by a client component of the application hosting platform 102 or be rendered by a web browser hosted by the client device 108.

The virtualized computing environment 160 may be instantiated to facilitate execution of the instance of the application 130 for access by client device 108 and may be deconstructed after a termination of the application instance as requested by a user of client device 108, in accordance with embodiments provided herein. For example, a user accessing the application instance via the application hosting platform GUI on client device 108 may log out of an account associated with application 130 hosted by application hosting platform 102. When it is detected that the user has "logged out" of the associated account, application load manager 150 may transmit a deconstruct request to server 106, which may cause a hypervisor to deconstruct virtualized computing environment 160.

A user of a respective client device 108 may engage with (e.g., consume, interact, etc.) the application 130 (e.g., via the application hosting platform GUI) that is loaded with the generic data 132 and user data 134 to progress through the application via the respective client device 108. In an illustrative example, applications 130A and 130B may be video game applications (e.g., gaming applications) developed by a video game developer. In another illustrative example, applications 130A and 130B may be content or asset creation applications of a cloud-hosted, collaborative content creation platform. Generic data 132 and user data 134 of a respective video game application 130 can be presented at an application hosting platform GUI on a client device 108 for consumption by a user of client device 108. In some embodiments, generic data 132 can include assets, textures, artwork of the application 130, background graphics, title screens, main menu screens, memory allocation of the gaming application 130 on the client device 108, shaders, etc. In some embodiments, user data 134 can include data the application 130 loads specifically for a respective client device 108 that has selected the gaming application 130—e.g., for a specific user. For example, user data 134 can include specific user settings (e.g., resolution or shader settings), custom user content (e.g., customizations to a character in a game made by the user), custom key bindings, etc. Accordingly, a user can customize the experience of executing the gaming application 130 at their respective client device 108.

The client devices 108 may include devices, including but not limited to: televisions, smart phones, cellular telephones, personal digital assistants (PDAs), portable media players, netbooks, laptop computers, electronic book readers, tablet computers, desktop computers, set-top boxes, gaming consoles, and the like. As discussed above, the individual client devices 108 may include a client component of the application hosting platform 102 (or a web browser) that provides a GUI allowing a user of client device 108 to request execution of application 130. The GUI may provide a rendered version of the generic data 132 and user data 134 for presentation during a runtime of the application 130 and allow the user to provide input during the runtime of the application 130.

In some embodiments, server machine 106 can be separate from a serve machine that supports application hosting platform 102. In other embodiments, server machine 106 can be part of the application hosting platform 102. In some embodiments, one or more server machines 106, application hosting platforms 102, application developer platforms 104, and data stores 112 can be part of a cloud environment that can be accessed by client devices 108A-N via network 120.

Figure 2:
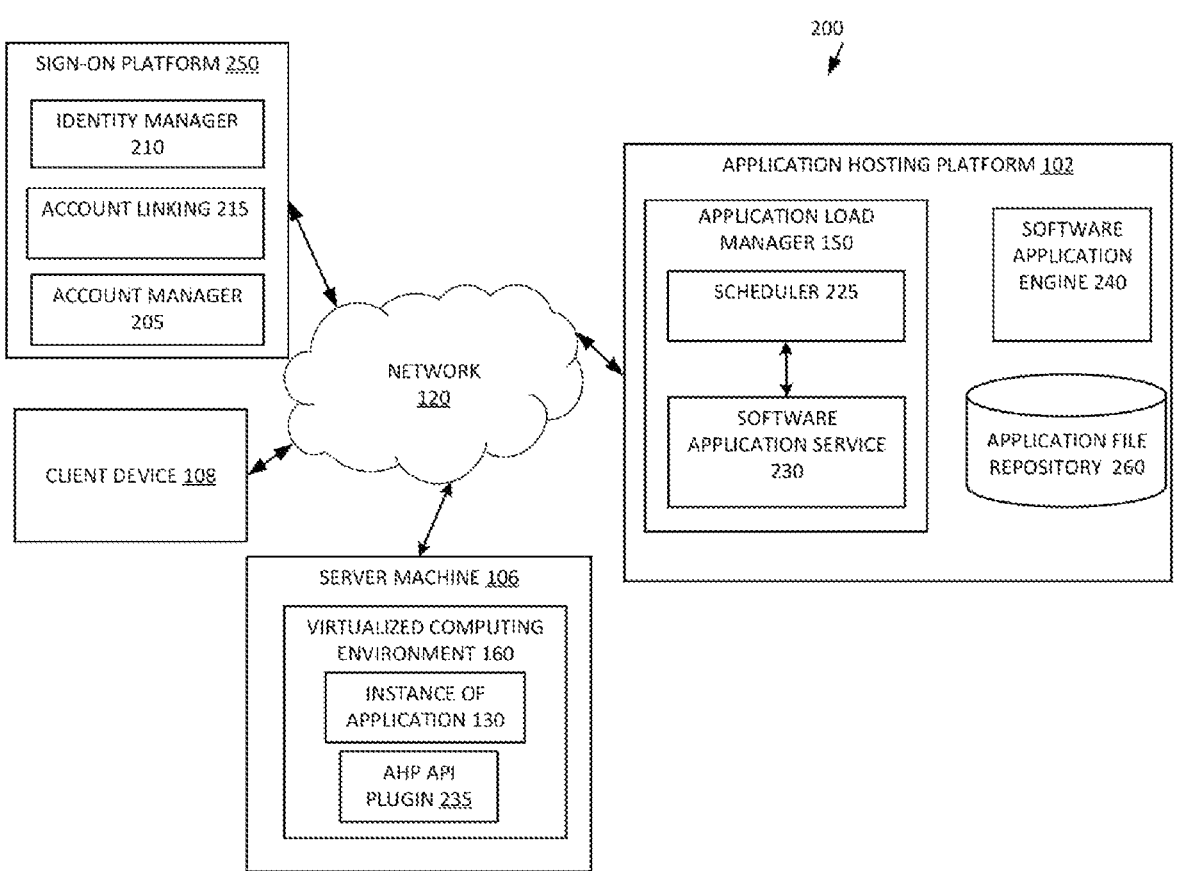
FIG. 2 illustrates a block diagram of a cloud environment, in accordance with at least some embodiments.

FIG. 2 illustrates a block diagram of a cloud environment 200, according to at least one embodiment. In some embodiments, cloud environment 200 includes application hosting platform 102, sign-on platform 250, and one or more servers 106 each providing one or more virtual computing environments 160. Client device 108 is connected to the cloud environment via network 120 as described with reference to FIG. 1. In some embodiments, the sign-on platform 250 can include an account manager 205, an account linking component 215, and an identity manager 210. The application hosting platform 102 can include application load manager 150 which includes a scheduler 225, and a software application service 230. The application hosting platform 102 can also include a gaming application engine 240 and application file repository 260.

In some embodiments, account linking component 215 can link an account of a user of client device 108 with an account associated with the application hosting platform 102. In some embodiments, account linking component 215 can also determine whether an account of the user of client device 108 associated with an application (e.g., application 130 as described with reference to FIG. 1) is linked or if the user is "logged in." In at least one embodiment, if the account of the user associated with the application 130 is not linked, the account linking component 215 can facilitate linking the account. In at least one embodiment, if the account of the user associated with the application 130 is linked, the account linking component 215 can store the respective credentials or access and refresh tokens (e.g., tokens used to allow user access to the application 130). In some embodiments, the account linking component 215 can link or maintain credentials of many different users for a number of applications 130 hosted by the application hosting platform 130.

In at least one embodiment, account manager 205 can manage an account associated with the application 130 for a user of the client device 108. For example, the account manager 205 can provide a UI that allows the user of the client device 108 to log into an account associated with the application 130.

In at least one embodiment, sign-on platform 250 can include a unique account manager 205 for each unique application 130 hosted at the application hosting platform 130. In some embodiments, identity manager 210 can validate (e.g., check) to ensure the credentials of the user are associated with an account of the application 130. That is, the identity manager 210 can enable the user to access their account associated with the application 130.

Application hosting platform 102 can include application load manager 150 that can enable staged loading of an instance of the application 130 into virtualized computing environment 160, and application file repository 260 that stores files of various applications registered with the application hosting platform 102. In some embodiments, the application hosting platform 102 can cause an instance of the application 130 at the virtualized computing environment 160 to stream content of the application to the client device 108—e.g., to the application hosting platform (AHP) GUI as described with reference to FIG. 1. In one embodiment, the application 130 can be an example of a gaming application (e.g., a video game) or a collaborative content creation platform or application. In such examples, the virtualized computing environment 160 can store or load an instance of the gaming application. The instance of the gaming application can stream gaming content to the client device 108 when a user of the client device initiates a session.

In at least one embodiment, the application load manager 150 of the application hosting platform 102 can include a scheduler 225. In one embodiment, the scheduler 225 may be configured to initiate or launch an instance of a gaming application 130 for a user of the client device 108. In one embodiment, the scheduler 225 can issue a request to allocate (e.g., create) a virtualized computing environment 160 at server 106. For example, the scheduler 225 can initiate creating the virtualized computing environment 160 by sending a request to a virtual system manager (that manages creation, deconstruction, etc. of virtualized computing environments 160 across servers 106) or directly to a hypervisor or host operating system of server 106. In some embodiments, the scheduler 225 can also send a notification to the software application service 230, which can launch an instance of the gaming application 130 in a pre-load mode to the virtualized computing environment 160.

In at least one embodiment, the application 130 is integrated with an application hosting platform (AHP) API plugin 235 (e.g., a designated software development kit (SDK)) that can be configured to communicate with the application hosting platform 104 via a predefined set of API commands to launch and/or load an instance of gaming application 130 on virtualized computing environment 160. In one embodiment, the AHP API plugin 235 can be configured to determine when a software application 130 is pre-loaded and fully loaded. In some embodiments, application hosting platform 130 can have a unique AHP API plugin for each software application 130 it hosts. Alternatively, a common AHP API plugin can be operable with all software applications hosted/registered with the application hosting platform 102.

As described with reference to FIG. 1, a software application 130 can include generic data and user data (e.g., the generic data and optionally some of the user date can be stored in application file repository 260). As described herein, the application hosting platform can cause a software application 130 to be pre-loaded before a user of client device 108 initiates a session. In such embodiments, the application hosting platform 102 can provide instructions to launch and pre-loaded software application 130. In at least one embodiment, the application hosting platform 102 can facilitate loading most of (or all) generic data associated with the software application 130 before a user initiates (e.g., launches) the software application 130. This can enable the user to begin streaming content of an instance of the software application 130 to their client device 108 quickly, and improve the overall user experience.

For example, scheduler 225 can issue a request to allocate (or generate) a virtualized computing environment 160 at which to pre-load a gaming application 130. In some embodiments, the scheduler 235 can request to allocate several different virtualized computing environments 160—e.g., so multiple users initiating sessions at different times can access a pre-loaded instance of the gaming application 130. In one embodiment, the number of virtualized computing environments 160 the scheduler 225 requests to allocate to a given gaming application 130 can be based on heuristics. For example, in one embodiment, the scheduler 225 can analyze telemetry data (e.g., collected by gaming application engine 240 or another component) indicating an average duration that a virtualized computing environment 225 for a respective software application 130 is idle or a number of users that are unable to access a pre-loaded instance of the software application 130. In one embodiment, the scheduler 225 can request to allocate additional virtualized computing environment 220 for a respective software application 225 if a number of users unable to access a pre-loaded instance of the software application 130 exceeds a threshold number—e.g., one (1). For example, if a number of users attempting to execute the software application is greater than the number of virtualized computing environments 160 storing a pre-loaded instance of the software application, the application hosting platform 102 can allocate additional virtualized computing environments for the software application. In some embodiments, the threshold number can be based on how popular (e.g., how many users request to launch) the software application 130. In another embodiment, the scheduler 225 can reduce a number of allocated virtualized computing environment 160 for a respective software application 130 if an average idle time duration exceeds a threshold number—e.g., pre-loaded instances of the software application 130 remain idle for a relatively long time (e.g., for at least a threshold time period).

In one embodiment, after a virtualized computing environment 160 is allocated for a pre-loaded instance of software application 130, the application hosting platform 102 can communicate with the software application 130 to initiate loading generic data. Upon loading the generic data, the AHP API plugin 235 can inform the application hosting platform 102 AHP API plugin that the instance of software application 130 is pre-loaded. In such embodiments, the virtualized computing environment 160 can remain idle until a user initiates a session. In some embodiments, when the user initiates the session, the application hosting platform 102 can facilitate loading of user data to the virtualized computing environment 220. Accordingly, the instance of the software application 130 on the virtualized computing environment 160 can be fully loaded and begin to stream (e.g., gaming or graphical) content of the instance of the software application 130 to the user's client device 108.

In some embodiments, the application hosting platform 102 can utilize gaming application engine 240 to determine when an instance of a gaming application 130 is done pre-loading in lieu of receiving a notification from the AHP API plugin 235. For example, gaming application engine 240 can use a machine learning model(s) trained to predict when the instance of the gaming application 130 is done pre-loading. In some embodiments, the machine learning model can be trained using historical data indicating how long it takes for an application with particular characteristics (e.g., the size of application files, type of content produced by the application, graphics and sound effects used, etc.) to be pre-loaded under certain network conditions. Alternatively or in addition, the machine learning model can be trained specifically for the software application 130. In some instances, the gaming application engine 240 can determine when the software application 130 is done pre-loading based on detecting when the software application 130 reaches a main menu screen—e.g., a title sequence. Over time, the gaming application engine 240 can collect this data indicating how long it took for previously created instances of the software application 130 to be pre-loaded under certain network conditions, and provide this collected data as input data to train (or retrain) the machine learning model for the software application 130. In such embodiments, the gaming application engine 240 can use the trained machine learning model to predict when the software application will be pre-loaded—e.g., determine a duration after which the gaming application will be pre-loaded. If the software application 130 undergoes an update or the duration to launch changes, the machine learning model can be retrained. Accordingly, the gaming application engine 240 can continuously improve its accuracy of predicting when the software application will be pre-loaded. By utilizing the gaming application engine 240, the application hosting platform 102 can allocate virtualized computing environments 160 for a respective software application more efficiently than waiting for notifications from the AHP API plugin 235.

In one embodiment, once a number of virtualized computing environment 160 for a respective software application are pre-loaded, users initiating a session can access a pre-loaded instance of software application 130 in a first-in first-out scheme (e.g., on a first come first served basis). In other embodiments, once a number of virtualized computing environment 160 for a respective software application 325 are pre-loaded, users initiating a session can access the pre-loaded instance of software application 130 in a tiered system—e.g., premium users can access the pre-loaded instance of software application 130 before other users.

Additional details regarding the process of pre-loading the software application 130 and the set of APIs utilized are described with reference to FIGS. 3-5.

Figure 3:
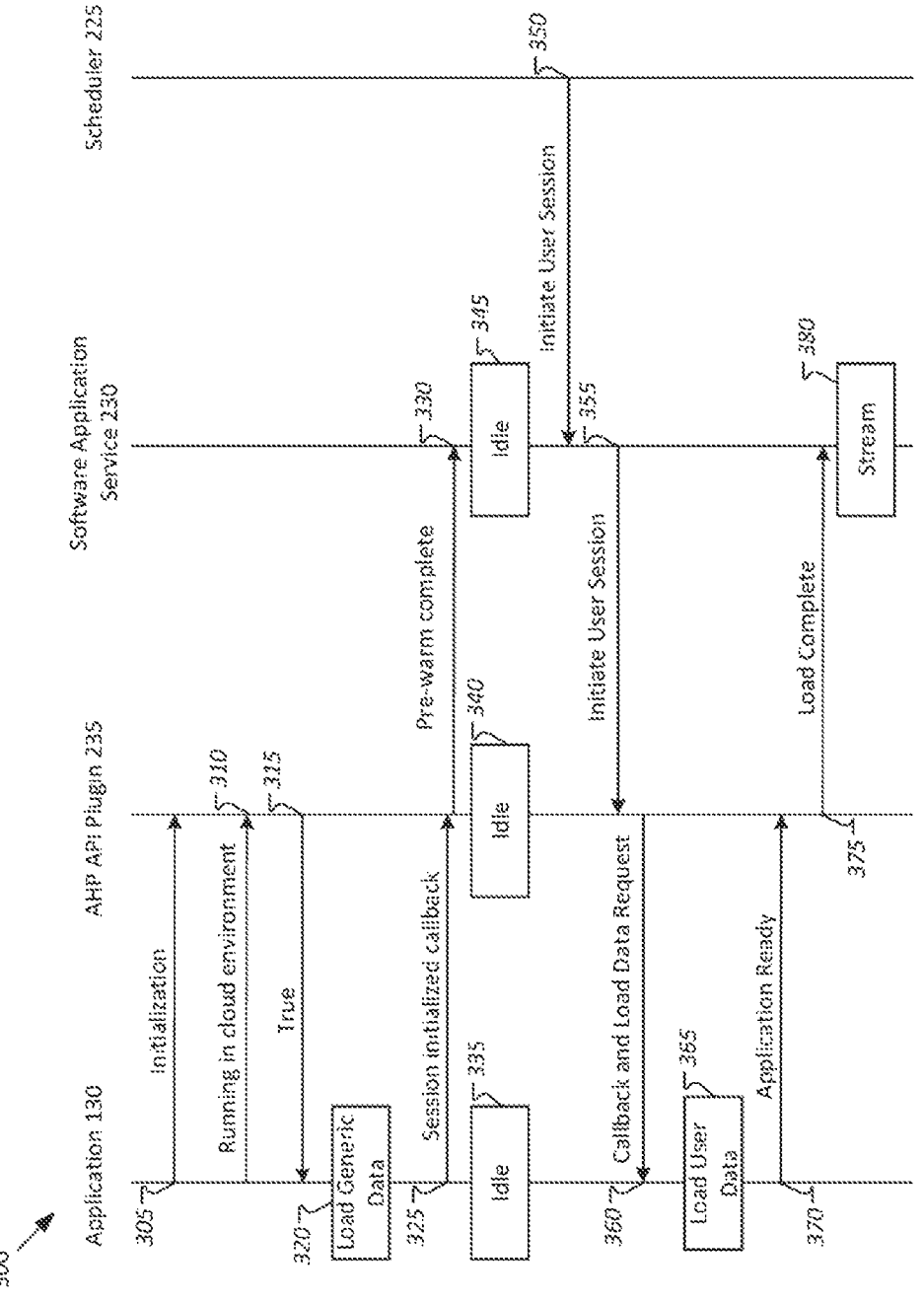
FIG. 3 illustrates a diagram of an example of pre-loading a software application, in accordance with at least some embodiments.

FIG. 3 illustrates an example diagram of pre-loading a software application, in accordance with at least one embodiment. For example, diagram 300 illustrates pre-loading a software application with generic data before a user initiates a session to launch the software application. Diagram 400 can be performed by processing logic comprising hardware, software, firmware, or any combination thereof. In at least one embodiment, diagram 300 includes operations performed by cloud environment 200, including application hosting platform 102, application 130, application hosting platform (AHP) API plugin 235, software application service 230, and scheduler 225, as described with reference to FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other diagrams illustrating a pre-loading a gaming application are possible.

At operation 305, software application 130 can begin an initialization procedure using AHP API plugin 235. In at least one embodiment, the application hosting platform 102 can integrate the AHP API plugin (e.g., a designated SDK) 235 into the software application to enable the software application to launch in pre-load mode. That is, the software application can have a launch sequence (e.g., an initialization sequence) and an order in which it loads files. The application hosting platform 102 can integrate the AHP API plugin 235 to modify certain sequences in order to load as much generic data as possible when launching in the pre-load mode—e.g., send the initialization request to the application hosting platform 102 before virtualized computing environments 160 are allocated. In some embodiments, the AHP API plugin 235 can also be configured to use a specific mechanism for requesting the software application to launch in a pre-load mode. For example, based on information provided by the application developer platform 104 (when registering the software application with the application hosting platform 102), the AHP API plugin 235 can be configured to request launch in the pre-load mode using a CLI command, a flag setting (e.g., in the application's configuration file), or a confirmation that the software application is present in the cloud environment.

At operation 310, the software application 130 can communicate with the AHP API plugin 235 to confirm that the software application will run in a cloud environment. For example, the application developer platform 104 can develop the software application to be played in both cloud environment and non-cloud environments (e.g., loaded locally)—e.g., application developer can develop the software application for different contexts. In some embodiments, for each context (e.g., for different computing devices or consoles) the software application can include different settings, launch sequences, etc. Accordingly, by confirming that the software application will run in the cloud environment, the software application will use the correct settings that are designated for the cloud environment 200.

At operation 315, the AHP API plugin 235 can confirm to the software application 130 (e.g., using an API) that the software application is running in the cloud environment. In some embodiments, the AHP API plugin 235 can return a "true" value when the software application 130 is running in a cloud environment and a "false" value when the software application 130 is not running in a cloud environment (e.g., running on the client device). In some embodiments, the AHP API plugin 235 can also communicate to the software application 130 that it should be launched in the pre-load mode when sending the "true value." For example, at operation 315, the AHP API plugin 235 can issue the command line argument or the flag on disk to initiate the launch of the gaming application based on the initialization at operation 305. In embodiments where the software application is launched in pre-load mode based on being in the cloud environment, the software application 130 can begin to launch before the AHP API plugin 235 communicates the "true" value.

At operation 320, the software application 130 at the virtualized computing environment 160 can begin load generic data (e.g., from application file repository 260). In one embodiment, the generic data can include assets, textures, artwork of the software application, background graphics, title screens, main menu screens, memory allocation of the software application on the client device, shaders, etc. for the software application-all or most of the data that is exclusive of user data. The amount of generic data versus user data (e.g., a percentage of data that is generic data) can be unique for each software application and be defined by the application developer.

At operation 325, the software application 130 can transmit (e.g., via an API) an indication that pre-loading is complete. In one embodiment, the software application 130 can issue, via an API, a message (e.g., RegisterSessionInit-Callback or session initialized callback) that indicates a session can start and the software application 130 can enter an idle mode to wait for a callback to resume loading the remaining data—e.g., the user data. In some embodiments, the AHP API plugin 235, a gaming application engine, or the application hosting platform 102 can predict when the software application pre-loading will be complete (e.g., based on machine learning) as described with reference to FIG. 2. In such embodiments, the AHP API plugin 235 or the application load manager 150 can determine the software application is done pre-loading without a notification API message from the software application 130—e.g., the application hosting platform can forgo operations 325 and 330.

At operation 330, the AHP API plugin 235 can notify the software application service 230 that the pre-load of the software application is complete. In some embodiments, the software application service 230 can also communicate to the scheduler 225 that the software application is done pre-loading. At operation 330, the pre-loaded instance of software application can be ready for access by a user.

At operations 335, 340, and 345, the software application 130 and AHP API plugin 235 can go idle. In some embodiments, the virtualized computing environment 160 hosting the instance of the pre-loaded gaming application can also be idle with regards to the pre-loaded instance of the gaming application while waiting for a user to initiate a session and continue loading the rest of the gaming application.

At operation 350, the scheduler 225 can indicate to the software application service 230 that a user is initiating a session of the gaming application. That is, a user can "log in" to their account and identify the gaming application for execution—e.g., select the gaming application in order to play. Additional details regarding the user interaction are described with reference to FIGS. 4 and 5.

At operation 355, the software application service 230 can indicate to the AHP API plugin 335 to initiate a user session of the gaming application.

At operation 360, the AHP API plugin 335 can communicate a message (e.g., via an API callback) to the software application 104. In at least one embodiment, the AHP API plugin 335 can transmit a message to the software application 130 to resume operation—e.g., the pre-loaded software application at the virtualized computing environment 160. In such embodiments, the AHP API plugin 235 can communicate a messages (e.g., API SessionIntCallback) that indicates to resume the previously pre-loaded software application session. In some embodiments, the AHP API plugin 235 can also indicate to the software application 130 to load the remaining data (e.g., the user data). Additional details regarding the communication of user data is described with reference to FIGS. 4 and 5.

At operation 365, the software application can load user data for the software application. In at least one embodiment, the software application can utilize the user data to load to its title or main menu screen. That is, the software application 130 can continue loading the data (including user data) until it is ready to be played by a user of a client device 108.

At operation 370, the software application 130 can communicate that it is ready to the AHP API plugin 235. In at least one embodiment, the software application 130 can communicate, via an API (e.g., AppReady), to inform the AHP API plugin 235 that the software application is successfully loaded and is ready to be executed by a user.

At operation 375, the AHP API plugin 235 can notify the software application service 230 that the software application is loaded and ready for a user to execute.

At operation 380, the software application service 230 can request to start streaming graphical or interface content of the instance of the software application. In at least one embodiment, the software content can be streamed to a client device 108. In some embodiments, the client device 108 can be associated with the user that initiated the session. In at least one embodiment, the user may not see a stream until the software application is ready to be interacted with—e.g., until the main menu or title sequence is loaded. In at least one embodiment, the overall user experience can be improved as the wait time for the user is reduced because the generic data is pre-loaded and the user is not shown the game until the software application is ready to be played.

Figure 4:
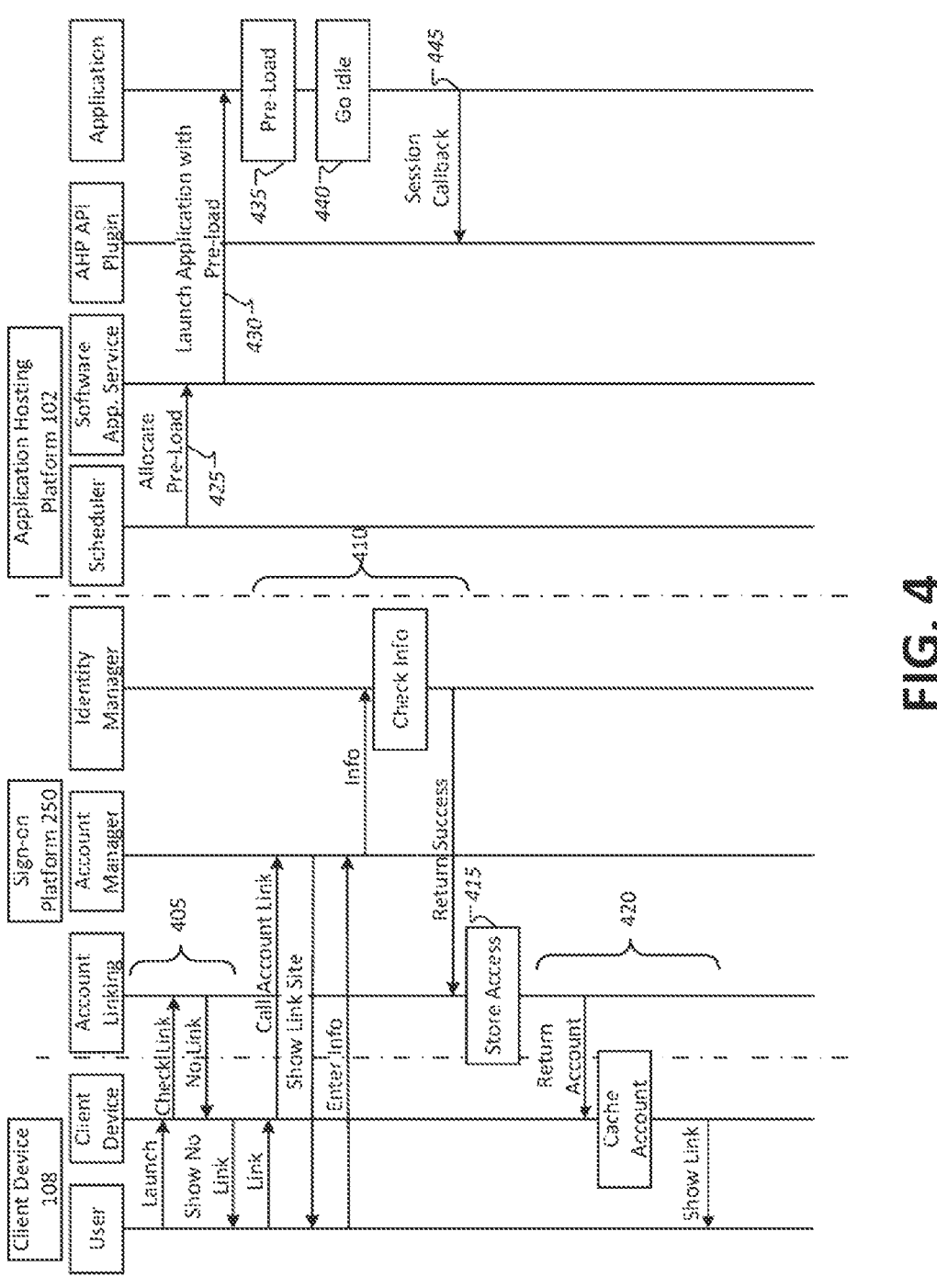
FIG. 4 illustrates a diagram of an example of pre-loading a software application, in accordance with at least some embodiments.

FIG. 4 illustrates an example diagram of pre-loading a software application before a user "logs" into an account, in accordance with at least one embodiment. For example, diagram 400 illustrates pre-loading before or while a user begins to access an account associated with the software application. Diagram 400 can be performed by processing logic comprising hardware, software, firmware, or any combination thereof. In at least one embodiment, diagram 400 includes operations performed by client 108 and cloud environment 200, including sign-on platform 250 (account manager 205, identity manager 210, account linking 215), application hosting platform 102, (software application service 230 and scheduler 225), and software application 130 with AHP API plugin 235 (e.g., instance of software application with AHP API plugin on virtualized computing environment 160) as described with reference to FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other diagrams illustrating a pre-loading a software application are possible.

At operation 405, the client device 108 and the account linking component 215 can communicate to determine whether an account of a user of client device 108 is linked to the application hosting platform. In one embodiment, the user can request to launch a software application at the client device 108. In such embodiments, the client device 108 can check an account link with account linking component 215. In one embodiment, the account linking component 215 can determine there is no account link. In such embodiments, the client device 108 can (via a UI) show there is no account link to the user. In some embodiments, the account linking component 215 can determine there is an account link. That is, the account linking component 215 can determine an account of the user is either saved or was previously used to access the software application. In such examples, the account linking component 215 can proceed to operation 415.

At operation 410, an account of the user of client device 108 can be linked to the application hosting platform 102 and the software application 130. In one embodiment, after determining there is no link, the client device 108 can render a UI that enables a user to select an option to enter their credentials and link their account. In some embodiments, the client device 108 can call for an account link via an API communicated to the account manager 205. In such embodiments, the client device 108 can request for a redirect universal resource identifier (URI) that enables the user to enter their information. In some embodiments, the account manager 205 can redirect the client device 108 to show a link (e.g., a website link, or a web user interface (UI)) to the user to enable the user to log into their account associated with the software application. In such embodiments, the credentials (e.g., information) is sent to the identity manager 210. In some embodiments, the identity manager 210 can be configured to check or validate credentials and information received regarding an account of a user. For example, the identity manager 210 can validate the credentials received from the user via the web UI. In some embodiments, if the account information is correct, the identity manager 210 can generate access to the account and generate refresh tokens. In some embodiments, if the account information is incorrect, the identity manager 210 can notify the user via the client device 108 the information was incorrect.

During operation 410, the identify manager 210 can transmit a notification to the account linking component that the information provided by the user is correct. In some embodiments, the notification can include access and refresh tokens.

At operation 415, the account linking component 215 can store the access and refresh tokens. In at least one embodiment, by storing the access and refresh tokens, the access linking component 215 can link the user account with the software application and the application hosting platform.

At operation 420, a user can be notified their account is linked with the software application and the hosting platform. For example, if the account linking component 215 determines the account information and/or credentials are stored, the account linking component 215 can return the account name and the token expiration (e.g., the expiration of the access tokens) to the client device 108. In response to receiving the account name, the client device 108 can cache the account link and the account information. In such embodiments, the user can access the software application faster as the account information is previously provided and saved. In response to caching the account information, the client device 108 can show a UI that enables the user to see the account is successfully linked.

In some embodiments, the operations 425-445 can be performed before or concurrent with the user linking their account with the software application and application hosting platform. That is, the application hosting platform can enable pre-loading of an instance of the software application (as described with reference to FIGS. 2 and 3) before a user begins to initiate a session. As described with reference to FIGS. 2 and 3, the scheduler can request to allocate a pre-load for an instance of a software application. In at least one embodiment, the request to allocate the pre-load can be based on heuristics as described with reference to FIG. 2. In some embodiments, the application hosting platform can request to allocate several pre-loads—e.g., a single software application can be pre-loaded several times across multiple virtualized computing environments 160.

At operation 430, the software application service 230, can launch the software application in a pre-load mode via the AHP API plugin 235. As described with reference to FIG. 4, the software application can be launched by the AHP API plugin 235 using a CLI command, a flag setting (in the application's configuration file), or a confirmation that the software application is running in the cloud environment.

At operation 435, the virtualized computing environment 160 can be pre-loaded with all (or most) of the generic data of software application—e.g., the application developer platform can load generic data to the instance of the software application at the virtualized computing environment 160.

At operation 440, the instance of the software application at the hosting platform can go idle. In at least one embodiment, the instance of the software application can go idle and wait for a user to initiate a session. Because the instance of the software application is pre-loaded with the generic data, the loading time after the user initiates the session is reduced and improves the overall user experience.

At operation 445, the software application can transmit an indication (e.g., via an API message) that the software application is pre-loaded and awaiting a callback when a user initiates a session as described with reference to FIG. 3.

Figure 5:
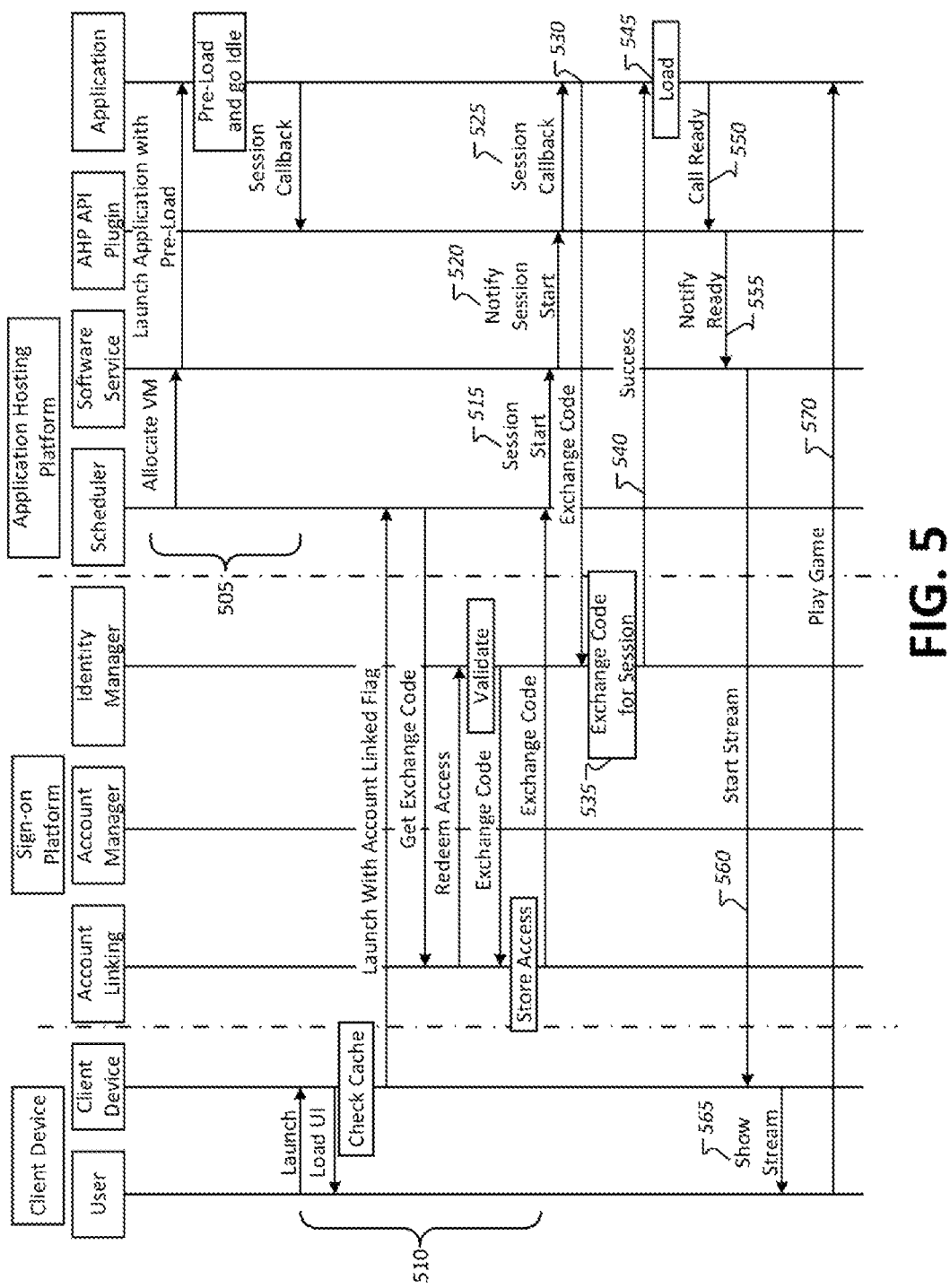
FIG. 5 illustrates a diagram of an example of pre-loading a software application, in accordance with at least some embodiments.

FIG. 5 illustrates an example diagram of pre-loading a software application and loading user data, in accordance with at least one embodiment. For example, diagram 500 illustrates pre-loading before a user initiates a session and subsequently loading user data. Diagram 500 can be performed by processing logic comprising hardware, software, firmware, or any combination thereof. In at least one embodiment, diagram 500 includes operations performed by client 108 and cloud environment 200, including sign-on platform 250 (account manager 205, identity manager 210, account linking 215), application hosting platform 102 (software application service 230 and scheduler 225), and software application 130 with AHP API plugin 235 (e.g., instance of software application with AHP API plugin on virtualized computing environment 160) as described with reference to FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other diagrams illustrating a pre-loading a software application are possible.

At operation 505, application hosting platform 102 can launch an instance of a software application in a pre-load mode as described with reference to operations 425-445 of FIG. 4. That is, the scheduler 225 of the application hosting platform 102 can instruct to allocate a virtualized computing environment (e.g., use a running virtual machine (VM) or add a new VM) for an instance of software application 130, and launch and pre-load an instance of the gaming application 130 by loading generic data. The software application 130 can load the generic data, register for a session callback with AHP API plugin 235, and then go idle to wait for an API session call back from the AHP API plugin 235. In some embodiments, the virtualized computing environment 160 can notify the scheduler 225 that it is available for a user session and transition into an idle state.

At operation 510, a user can initiate a session of the software application 130 and have their account information verified for a launch of the software application. For example, a user can initiate a launch of a software application at a client device 108—e.g., requesting to launch a software application via a UI. In response to initiating the launch, the client device 108 can show the user a loading UI—e.g., a loading screen, a notification that the software application has begun loading, etc. Additionally, in some embodiments the client device 108 can check a cache (e.g., a local cache) to see if a user account is stored based on a previous account linking as described with reference to FIG. 4. In some embodiments, if the client device 108 cannot find an account in the cache, the user can be prompted to enter their credentials as described with reference to operation 410 of FIG. 4. In at least one embodiment, the client device 108 can find the account information in the cache. In such embodiments, the client device 108 can communicate with the scheduler 225 of the application hosting platform 102. For example, the client device 108 can request to launch the instance of the software application with the user account—e.g., via an account linked flag or an indication to load the software application with information associated with the user account. In response to receiving the flag, the scheduler 225 can request an exchange code from the account linking component in order to receive the information associated with the user account—e.g., user data.

During operation 510, in some embodiments the account linking component 215 can redeem stored access and refresh tokens with an identity manager 210 to access information associated with the user account. That is, as described with reference to operation 415 of FIG. 4, the account linking component 215 can store access and refresh tokens when a user "logs" into their account. In some embodiments, the account linking component 215 can access the access and refresh tokens to access the account information again. In some embodiments, in response to receiving the access and refresh tokens, the identity manager 210 can validate the access and refresh tokens, generate an exchange code, and generate new access tokens and refresh tokens. That is, the identity manager 210 can verify the tokens received from the account linking component 215 are associated with the user account—e.g., the information and credentials are correct. If the identity manager 210 validates the tokens from the account linking component 215, the identity manager 210 can send the generated exchange code and the new access and refresh tokens to the account linking component. In some embodiments, the account linking component can store the new access and refresh tokens and send the exchange code to the scheduler 225. Accordingly, the application hosting platform 102 can validate the user account and access the user data associated with the respective launched software application.

At operation 515, the scheduler 225 can request to start a session with the software application for the user. In some embodiments, the scheduler 225 can send a notification to the gaming application service 230 to start the session with information associated with the user—e.g., with the user data.

At operation 520, the software application service can notify the AHP API plugin 235 to communicate with the software application 130 to start a session for the user and load the user data. In some embodiments, the software application service maintains a list of pre-loaded instances of the software applications 130 on one or more virtualized computing environments 160, selects one of pre-loaded instances from the list, identifies the corresponding AHP API plugin 235 on the respective virtualized computing environment 160, and notifies it to communicate with the associated instance of the software application 130.

At operation 525, the AHP API plugin 235 can communicate with the software application 130 to initiate a session of the software application using the pre-loaded instance of the software application. For example, the AHP API plugin 235 can communicate an API session callback (e.g., SessionInitCallback) to the software application. In some embodiments, the AHP API plugin 235 can communicate the session callback to begin loading the user data to the software application instance that was pre-loaded in operation 505 as described above. In some embodiments, the AHP API plugin 235 can indicate to load the software application with the exchange code received from the software application service—e.g., to load the software application with the user data.

At operation 530, the software application can send the exchange code to the identity manager to login into the account of the user. In some embodiments, the software application can access the account of the user to obtain the user data—e.g., specific user settings (e.g., resolution or shader settings), custom user content (e.g., customizations to a character in a game made by the user), custom key bindings, etc. In some embodiments, the software application can communicate with the identity manager 210 to verify the credentials and access the user information.

At operation 535, the identity manager 210 can validate the exchange code. In at least one embodiment, the identity manager 210 associated with the software application can utilize the exchange code to initiate a session of the software application with the user data. For example, if the identity manager 210 verifies the exchange code (e.g., the exchange code matches the exchange code generated earlier), the identity manager 210 can allow the software application to log into the user account and access the information.

At operation 540, the identity manager 210 can indicate to the software application that the exchange code was valid and logging into the user account was successful.

At operation 545, the software application can log into the user account and begin to load the user data. In at least one embodiment, the instance of the software application at the virtualized computing environment 160 can be loaded with specific user settings (e.g., resolution or shader settings), custom user content (e.g., customizations to a character in a game made by the user), custom key bindings, etc. based on logging into the user account—e.g., the software application can customize the user experience based on user preferences and user account settings.

At operation 550, the software application can communicate with the AHP API plugin 235 via an API (e.g., Call AppReady). In some embodiments, the software application can notify the AHP API plugin 235 that the instance of the software application at the virtualized computing environment 160 is ready for a user. That is, the software application can notify the AHP API plugin 235 that both the user data and generic data are loaded and that a user can access the main menu or title sequence of the software application.

At operation 555, the AHP API plugin 235 can notify the software application service 230 that the instance of the software application is loaded and ready for the user.

At operation 560, the software application service 230 can initiate streaming of gaming or graphical content of the instance of the software application to the client device 108.

At operation 565, the client device 108 (e.g., client component of the software application or the web browser) can display the streamed content of the instance of the software application to the user via a UI.

At operation 570, the user can begin to play the game— e.g., interact with characters, advance further in storylines, play in multi-player modes, etc. In some embodiments, by pre-loading most of the generic data before the user initiates or launches the software application, the waiting time for the user is reduced and the overall user experience improves.

FIG. 6 illustrates a flow diagram of a method 600 for a pre-load of software applications in a cloud computing environment. The method 600 can be performed by processing logic comprising hardware, software, firmware, or any combination thereof. In at least one embodiment, the method 600 is performed by computing environment 200 as described with reference to FIGS. 2-5. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other diagrams illustrating a method to pre-load software applications are possible.

At operation 605, the processing logic can send, using an application hosting platform, a pre-load request to pre-load a first portion of data for an application hosted using the application hosting platform. In one embodiment, the processing logic can determine to allocate a number of virtualized computing environments to launch an instance of an application in a pre-load mode. In some embodiments, the processing logic can determine the number of virtualized computing environments to which pre-load the applications based on an average duration of other virtualized computing environments with the pre-loaded portion being idle. For example, the processing logic can determine to allocate a smaller number of virtualized computing environments for the application if the idle time is relatively long (e.g., below a threshold indicating that users are not executing the application). In some embodiments, the pre-load request can be received before a user input identifying the application for execution is received. That is, the processing logic can request the pre-load before a user selects the game for execution. In some embodiments, the first portion of data can be generic data—e.g., data exclusive of data associated with a user request. In some embodiments, the processing logic can include a command line interface or flag on disk in the first request to load the first portion of data. In some embodiments, the processing logic can transmit, using the application hosting platform, a plurality of pre-load requests to pre-load the first portion of data to a plurality of virtualized computing environments hosted by one or more computer systems at the cloud platform. In at least one embodiment, the application can include at least one of a gaming application, a video conferencing application, a content creation application, a cloud-hosted application, a collaborative content creation application, a cloud-hosted collaborative content creation application, a video streaming application, a machine learning application, or a simulation application. In some embodiments, the application hosting platform can include at least one of a cloud-hosted gaming service platform, a cloud-hosted collaborative content creation platform for heterogeneous content creation applications, a video streaming hosting platform, a testing platform for simulated or augmented content, a machine learning training platform, a machine learning deployment platform, or a video conferencing hosting platform.

At operation 610, the processing logic can receive, using the application hosting platform, a first indication that the first portion of data is pre-loaded for application using the virtualized computing environment. In some embodiments, the virtualized computing environment can be transitioned to an idle mode upon receiving the indication. That is, the processing logic can cause the virtualized computing environment to be placed into an idle mode as the pre-load is done and a user request is not received—e.g., the application cannot be fully loaded yet. In some embodiments, the processing logic can predict when the first portion of data is pre-loaded for the application using the virtualized computing environment. In such embodiments, the processing logic may monitor and store, and/or access average durations it took to pre-load instances of the application at the virtualized computing environments, and use this data to train a machine learning model. The processing logic can utilize the trained machine learning training model to predict when the pre-load is done. In some embodiments, the processing logic can receive a third indication that the first portion of data is pre-loaded to the plurality of virtualized computing environments.

At operation 615, the processing logic can receive, using the application hosting platform, a user request to execute the application. In one embodiment, the processing logic can receive the user request upon receiving the first indication. In some embodiments, the user request can be associated with a user at a client device. In some embodiments, the processing logic can receive an indication from the application of an update to one or more files of the application before receiving the user request. In such embodiments, the processing logic can deconstruct the virtualized computing environment in response to receiving the indication that the one or more files associated with the application are updated and pre-load a second virtualized computing environment with the updated files. In some embodiments, the processing logic can receive a second user request to execute the application. In such embodiments, the processing logic can execute the application running at a second virtualized computing environment from the plurality of virtualized computing environments.

At operation 620, the processing logic can send, using the application hosting platform, a load request to load a second portion of data for the application to the virtualized computing environment. In one embodiment, the second portion of data can be associated with user data—e.g., data associated with the user input or the user request. In at least one embodiment, the virtualized computing environment can transition from the idle state to an active state in order to load the second portion of data. In some embodiments, the processing logic can also send a second load request to load the second portion of data for the application at the second virtualized computing environment.

At operation 625, the processing logic can receive, using the application hosting platform, a second indication that the second portion of data is loaded for the application to the virtualized computing environment. In one embodiment, the processing logic can receive an indication that the user data is loaded for the application at the virtualized computing environment. In some embodiments, the second indication can also notify the processing logic the application at the virtualized computing environment is ready to be launched—e.g., ready for a user to engage with. In some embodiments, the processing logic can receive a fourth indication that the second portion of data is loaded for the application at the second virtualized computing environment.

At operation 630, the processing logic can cause the application to be executed using the virtualized computing environment. As a result, content of the instance of the application can be streamed to the user's device—e.g., the user can begin to play the application. In some embodiments, the processing logic can cause the application to execute at the second virtualized computing environment in response to the second user request.

Figure 7A:
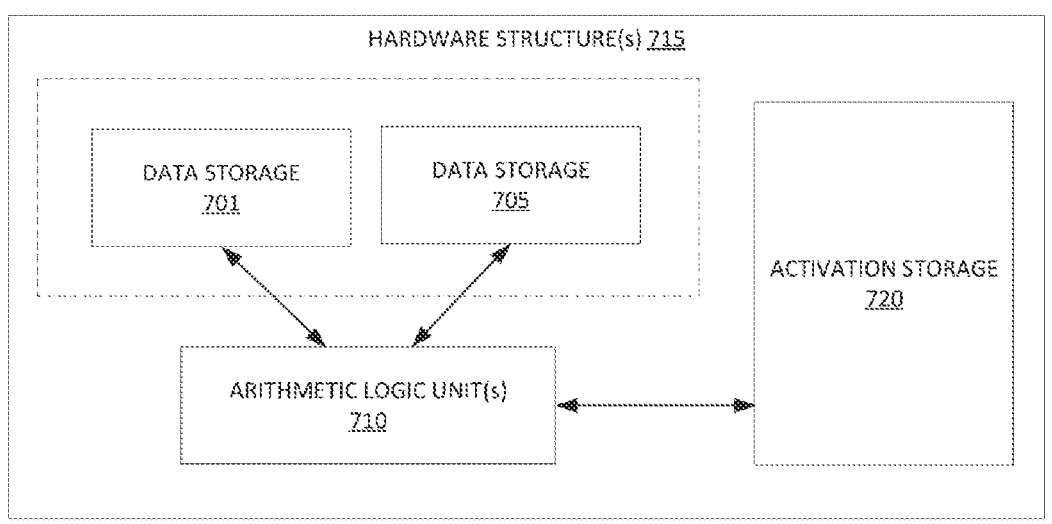
FIG. 7A illustrates an inference and/or training logic, in accordance with at least some embodiments.

FIG. 7A illustrates inference and/or training logic 715 used to perform inferencing and/or training operations associated with one or more embodiments. Details regarding inference and/or training logic 715 are provided below in conjunction with FIGS. 7A and/or 7B.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to on one or more processors or other hardware logic devices or circuits. In at least one embodiment, code and/or data storage 705 may be cache memory, DRAM, SRAM, non-volatile memory (e.g., Flash memory), or other storage. In at least one embodiment, choice of whether code and/or data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be same storage structure. In at least one embodiment, code and/or data storage 701 and code and/or data storage 705 may be partially same storage structure and partially separate storage structures. In at least one embodiment, any portion of code and/or data storage 701 code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or code and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALUs 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as data processing unit ("DPU") hardware, or field programmable gate arrays ("FP-GAs").

Figure 7B:
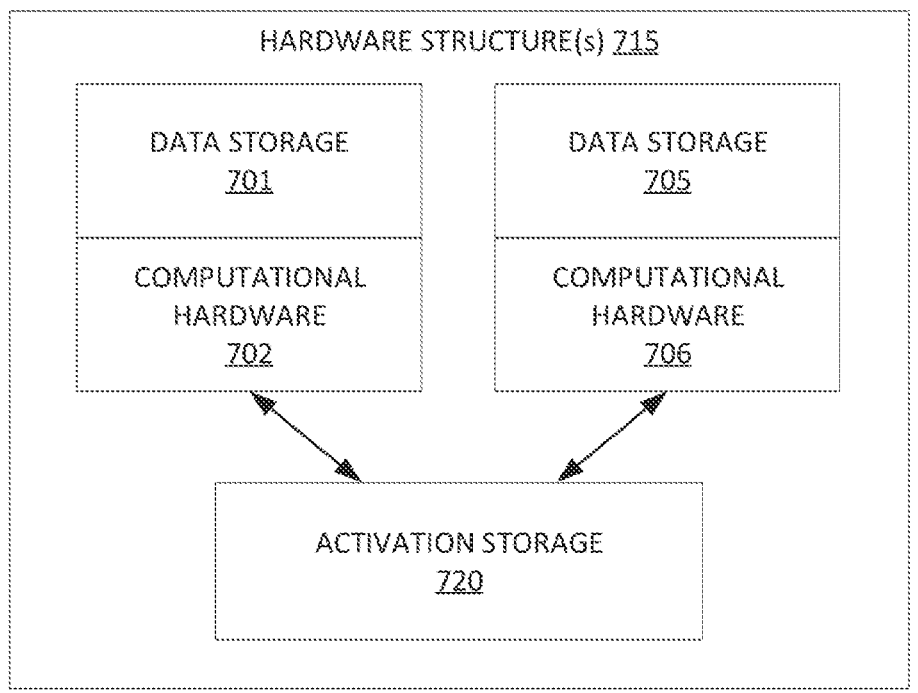
FIG. 7B illustrates an inference and/or training logic, in accordance with at least some embodiments.

FIG. 7B illustrates inference and/or training logic 715, according to at least one or more embodiments. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as data processing unit ("DPU") hardware, or field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one "storage/computational pair 701/702" of code and/or data storage 701 and computational hardware 702 is provided as an input to "storage/computational pair 705/706" of code and/or data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), data processing units, graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator may include hardware, software or some combination thereof.

In at least one embodiment, as shown in FIG. 8, framework layer 820 includes a job scheduler 822, a configuration manager 824, a resource manager 826 and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may utilize distributed file system 828 for large-scale data processing (e.g., "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. The one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underutilized and/or poor performing portions of a data center.

In at least one embodiment, data center 800 may include tools, services, software, or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, application-specific integrated circuits (ASICs), GPUs, DPUs FPGAs, or other hardware to perform training and/or inferencing using above-described resources. Moreover, one or more software and/or hardware resources described above may be configured as a service to allow users to train or perform inferencing of information, such as image recognition, speech recognition, or other artificial intelligence services.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 9:
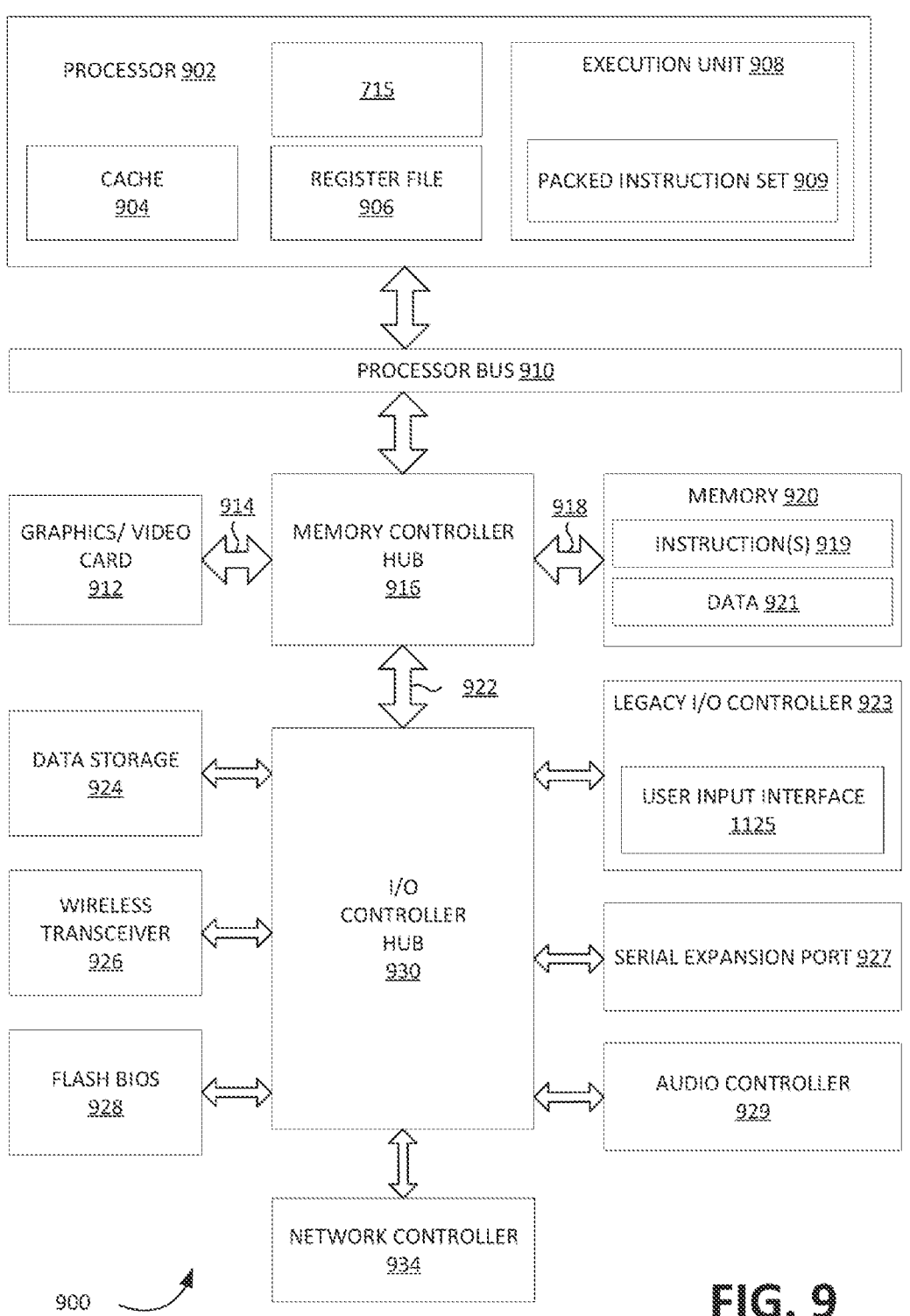
FIG. 9 illustrates a computer system, in accordance with at least some embodiments.

FIG. 9 is a block diagram illustrating an exemplary computer system, which may be a system with interconnected devices and components, a system-on-a-chip (SOC) or some combination thereof 900 formed with a processor that may include execution units to execute an instruction, according to at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, edge devices, Internet-of-Things ("IoT") devices, or any other system that may perform one or more instructions in accordance with at least one embodiment.

In at least one embodiment, computer system 900 may include, without limitation, processor 902 that may include, without limitation, one or more execution units 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. Other embodiments may also include a combination of both internal and external caches depending on particular implementation and needs. In at least one embodiment, register file 906 may store different types of data in various registers including, without limitation, integer registers, floating point registers, status registers, and instruction pointer register.

In at least one embodiment, execution unit 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a Dynamic Random Access Memory ("DRAM") device, a Static Random Access Memory ("SRAM") device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input and keyboard interfaces 925, a serial expansion port 927, such as Universal Serial Bus ("USB"), and a network controller 934, which may include in some embodiments, a data processing unit. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 900 are interconnected using compute express link (CXL) interconnects.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 10:
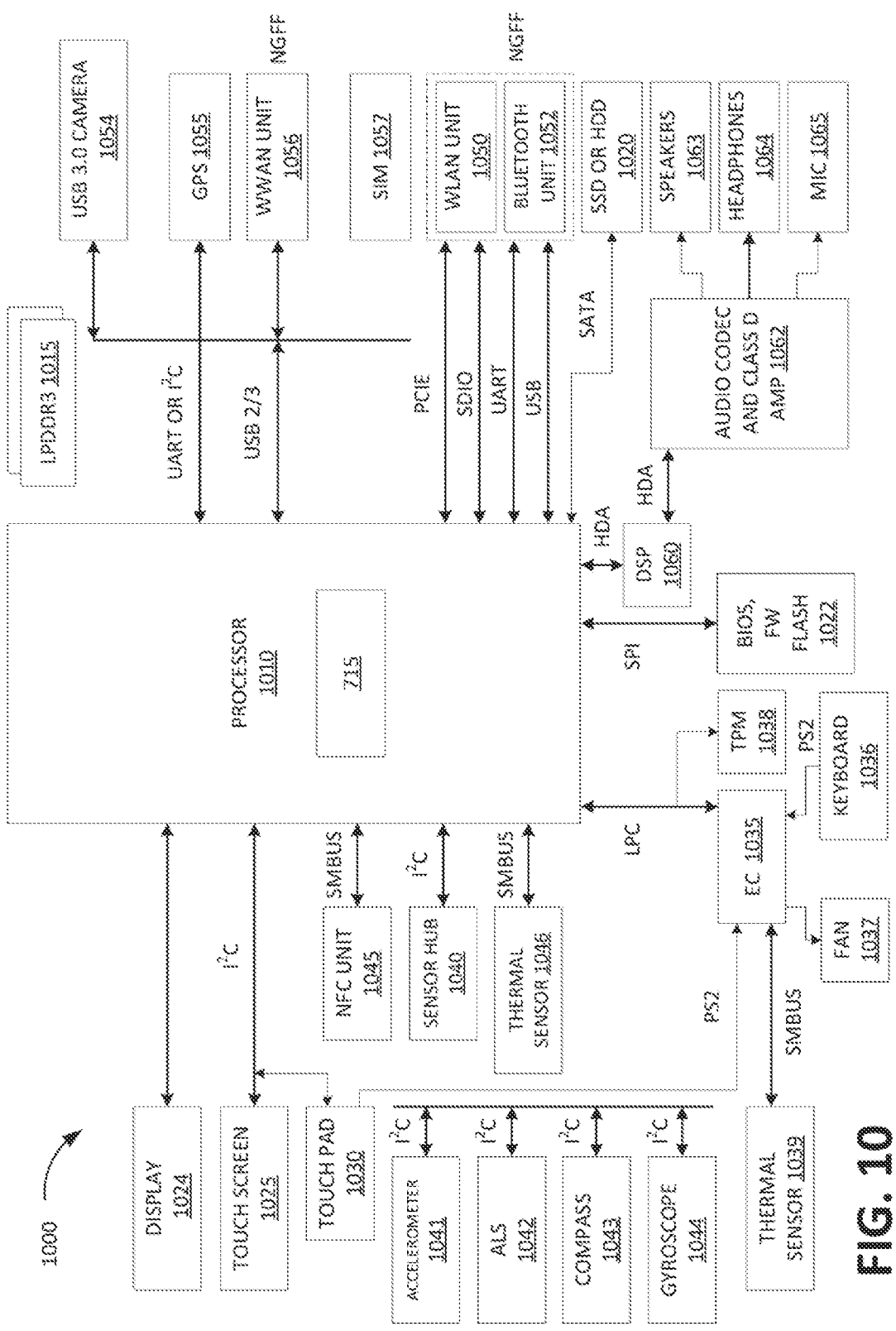
FIG. 10 illustrates a computer system, in accordance with at least some embodiments.

FIG. 10 is a block diagram illustrating an electronic device 1000 for utilizing a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, an edge device, an IoT device, or any other suitable electronic device.

In at least one embodiment, system 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 10 illustrates a system, which includes interconnected hardware devices or "chips", whereas in other embodiments, FIG. 10 may illustrate an exemplary System on a Chip ("SoC"). In at least one embodiment, devices illustrated in FIG. 10 may be interconnected with proprietary interconnects, standardized interconnects (e.g., PCIe) or some combination thereof. In at least one embodiment, one or more components of FIG. 10 are interconnected using compute express link (CXL) interconnects.

In at least one embodiment, FIG. 10 may include a display 1024, a touch screen 1025, a touch pad 1030, a Near Field Communications unit ("NFC") 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network unit ("WLAN") 1050, a Bluetooth unit 1052, a Wireless Wide Area Network unit ("WWAN") 1056, a Global Positioning System (GPS) 1055, a camera ("USB 3.0 camera") 1054 such as a USB 3.0 camera, and/or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1036, and a touch pad 1030 may be communicatively coupled to EC 1035. In at least one embodiment, speaker 1063, headphones 1064, and microphone ("mic") 1065 may be communicatively coupled to an audio unit ("audio codec and class d amp") 1062, which may in turn be communicatively coupled to DSP 1060. In at least one embodiment, audio unit 1064 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 10 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 11:
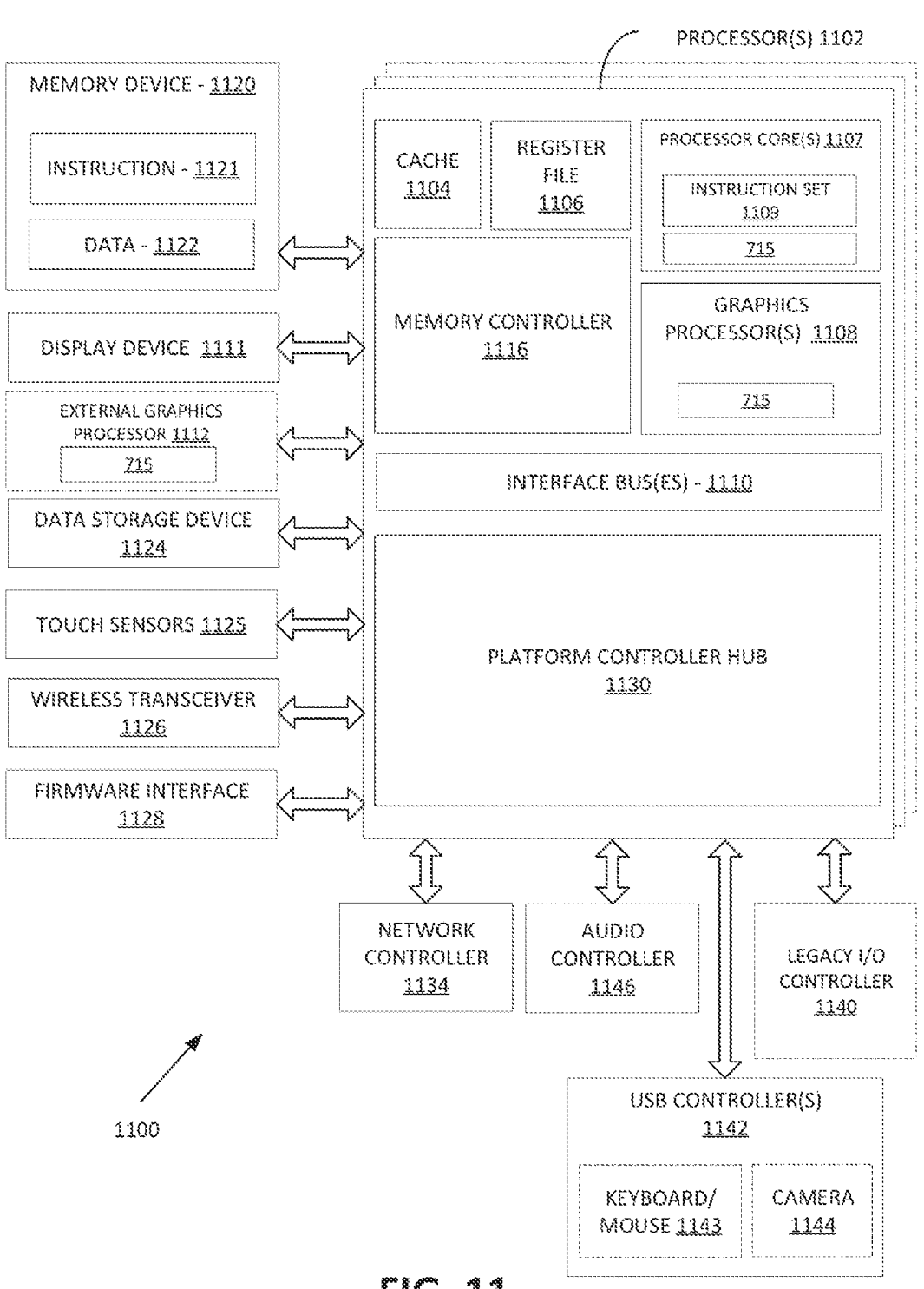
FIG. 11 illustrates at least portions of a graphics processor, in accordance with at least some embodiments.

FIG. 11 is a block diagram of a processing system, according to at least one embodiment. In at least one embodiment, system 1100 includes one or more processors 1102 and one or more graphics processors 1108, and may be a single processor desktop system, a multiprocessor workstation system, or a server system having a large number of processors 1102 or processor cores 1107. In at least one embodiment, system 1100 is a processing platform incorporated within a system-on-a-chip (SoC) integrated circuit for use in mobile, handheld, edge, or embedded devices.

In at least one embodiment, system 1100 may include, or be incorporated within a server-based gaming platform, a game console, including a game and media console, a mobile gaming console, a handheld game console, or an online game console. In at least one embodiment, system 1100 is a mobile phone, smart phone, tablet computing device or mobile Internet device. In at least one embodiment, processing system 1100 may also include, couple with, or be integrated within a wearable device, such as a smart watch wearable device, smart eyewear device, augmented reality device, or virtual reality device. In at least one embodiment, processing system 1100 is a television or set top box device having one or more processors 1102 and a graphical interface generated by one or more graphics processors 1108.

In at least one embodiment, one or more processors 1102 each include one or more processor cores 1107 to process instructions which, when executed, perform operations for system and user software. In at least one embodiment, each of one or more processor cores 1107 is configured to process a specific instruction set 1109. In at least one embodiment, instruction set 1109 may facilitate Complex Instruction Set Computing (CISC), Reduced Instruction Set Computing (RISC), or computing via a Very Long Instruction Word (VLIW). In at least one embodiment, processor cores 1107 may each process a different instruction set 1109, which may include instructions to facilitate emulation of other instruction sets. In at least one embodiment, processor core 1107 may also include other processing devices, such a Digital Signal Processor (DSP).

In at least one embodiment, processor 1102 includes cache memory 1104. In at least one embodiment, processor 1102 may have a single internal cache or multiple levels of internal cache. In at least one embodiment, cache memory is shared among various components of processor 1102. In at least one embodiment, processor 1102 also uses an external cache (e.g., a Level-3 (L3) cache or Last Level Cache (LLC)) (not shown), which may be shared among processor cores 1107 using known cache coherency techniques. In at least one embodiment, register file 1106 is additionally included in processor 1102 which may include different types of registers for storing different types of data (e.g., integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor 1102 and other components in system 1100. In at least one embodiment, interface bus 1110, in one embodiment, may be a processor bus, such as a version of a Direct Media Interface (DMI) bus. In at least one embodiment, interface 1110 is not limited to a DMI bus, and may include one or more Peripheral Component Interconnect buses (e.g., PCI, PCI Express), memory busses, or other types of interface busses. In at least one embodiment processor(s) 1102 include an integrated memory controller 1116 and a platform controller hub 1130. In at least one embodiment, memory controller 1116 facilitates communication between a memory device and other components of system 1100, while platform controller hub (PCH) 1130 provides connections to I/O devices via a local I/O bus.

In at least one embodiment, memory device 1120 may be a dynamic random access memory (DRAM) device, a static random access memory (SRAM) device, flash memory device, phase-change memory device, or some other memory device having suitable performance to serve as process memory. In at least one embodiment memory device 1120 may operate as system memory for system 1100, to store data 1122 and instructions 1121 for use when one or more processors 1102 executes an application or process. In at least one embodiment, memory controller 1116 also couples with an optional external graphics processor 1112, which may communicate with one or more graphics processors 1108 in processors 1102 to perform graphics and media operations. In at least one embodiment, a display device 1111 may connect to processor(s) 1102. In at least one embodiment display device 1111 may include one or more of an internal display device, as in a mobile electronic device or a laptop device or an external display device attached via a display interface (e.g., DisplayPort, etc.). In at least one embodiment, display device 1111 may include a head mounted display (HMD) such as a stereoscopic display device for use in virtual reality (VR) applications or augmented reality (AR) applications.

In at least one embodiment, platform controller hub 1130 enables peripherals to connect to memory device 1120 and processor 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). In at least one embodiment, data storage device 1124 may connect via a storage interface (e.g., SATA) or via a peripheral bus, such as a Peripheral Component Interconnect bus (e.g., PCI, PCI Express). In at least one embodiment, touch sensors 1125 may include touch screen sensors, pressure sensors, or fingerprint sensors. In at least one embodiment, wireless transceiver 1126 may be a Wi-Fi transceiver, a Bluetooth transceiver, or a mobile network transceiver such as a 3G, 4G, or Long Term Evolution (LTE) transceiver. In at least one embodiment, firmware interface 1128 enables communication with system firmware, and may be, for example, a unified extensible firmware interface (UEFI). In at least one embodiment, network controller 1134 may enable a network connection to a wired network. In at least one embodiment, a high-performance network controller (not shown) couples with interface bus 1110. In at least one embodiment, audio controller 1146 is a multi-channel high definition audio controller. In at least one embodiment, system 1100 includes an optional legacy I/O controller 1140 for coupling legacy (e.g., Personal System 2 (PS/2)) devices to system. In at least one embodiment, platform controller hub 1130 may also connect to one or more Universal Serial Bus (USB) controllers 1142 connect input devices, such as keyboard and mouse 1143 combinations, a camera 1144, or other USB input devices.

In at least one embodiment, an instance of memory controller 1116 and platform controller hub 1130 may be integrated into a discreet external graphics processor, such as external graphics processor 1111. In at least one embodiment, platform controller hub 1130 and/or memory controller 1116 may be external to one or more processor(s) 1102. For example, in at least one embodiment, system 1100 may include an external memory controller 1116 and platform controller hub 1130, which may be configured as a memory controller hub and peripheral controller hub within a system chipset that is in communication with processor(s) 1102.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into graphics processor 1108. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 7A or 7B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Figure 12:
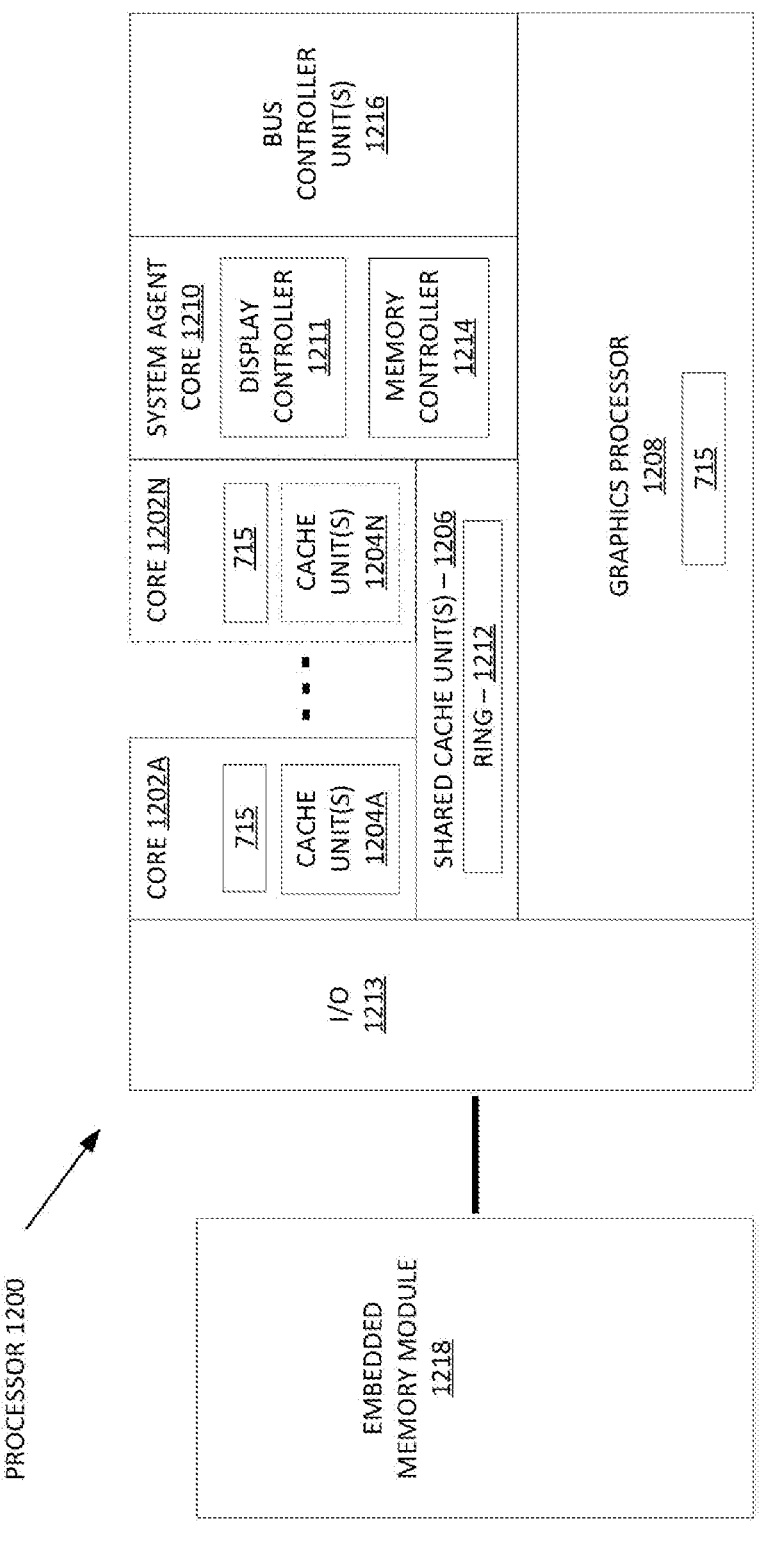
FIG. 12 illustrates at least portions of a graphic processor, in accordance with at least some embodiments.

FIG. 12 is a block diagram of a processor 1200 having one or more processor cores 1202A-1202N, an integrated memory controller 1213, and an integrated graphics processor 1208, according to at least one embodiment. In at least one embodiment, processor 1200 may include additional cores up to and including additional core 1202N represented by dashed lined boxes. In at least one embodiment, each of processor cores 1202A-1202N includes one or more internal cache units 1204A-1204N. In at least one embodiment, each processor core also has access to one or more shared cached units 1206.

In at least one embodiment, internal cache units 1204A-1204N and shared cache units 1206 represent a cache memory hierarchy within processor 1200. In at least one embodiment, cache memory units 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1206 and 1204A-1204N.

In at least one embodiment, processor 1200 may also include a set of one or more bus controller units 1216 and a system agent core 1210. In at least one embodiment, one or more bus controller units 1216 manage a set of peripheral buses, such as one or more PCI or PCI express busses. In at least one embodiment, system agent core 1210 provides management functionality for various processor components. In at least one embodiment, system agent core 1210 includes one or more integrated memory controllers 1213 to manage access to various external memory devices (not shown).

In at least one embodiment, one or more of processor cores 1202A-1202N include support for simultaneous multi-threading. In at least one embodiment, system agent core 1210 includes components for coordinating and operating cores 1202A-1202N during multi-threaded processing. In at least one embodiment, system agent core 1210 may additionally include a power control unit (PCU), which includes logic and components to regulate one or more power states of processor cores 1202A-1202N and graphics processor 1208.

In at least one embodiment, processor 1200 additionally includes graphics processor 1208 to execute graphics processing operations. In at least one embodiment, graphics processor 1208 couples with shared cache units 1206, and system agent core 1210, including one or more integrated memory controllers 1213. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with ring interconnect 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor cores 1202A-1202N and graphics processor 1208 use embedded memory modules 1218 as a shared Last Level Cache.

In at least one embodiment, processor cores 1202A-1202N are homogenous cores executing a common instruction set architecture. In at least one embodiment, processor cores 1202A-1202N are heterogeneous in terms of instruction set architecture (ISA), where one or more of processor cores 1202A-1202N execute a common instruction set, while one or more other cores of processor cores 1202A-1202N executes a subset of a common instruction set or a different instruction set. In at least one embodiment, processor cores 1202A-1202N are heterogeneous in terms of microarchitecture, where one or more cores having a relatively higher power consumption couple with one or more power cores having a lower power consumption. In at least one embodiment, processor 1200 may be implemented on one or more chips or as an SoC integrated circuit.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into processor 1200. For example, in at least one embodiment, training and/or inferencing techniques described herein may use one or more of ALUs embodied in graphics processor 1208, graphics core(s) 1202A-1202N, or other components in FIG. 12. Moreover, in at least one embodiment, inferencing and/or training operations described herein may be done using logic other than logic illustrated in FIG. 7A or 7B. In at least one embodiment, weight parameters may be stored in on-chip or off-chip memory and/or registers (shown or not shown) that configure ALUs of graphics processor 1200 to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Figure 13:
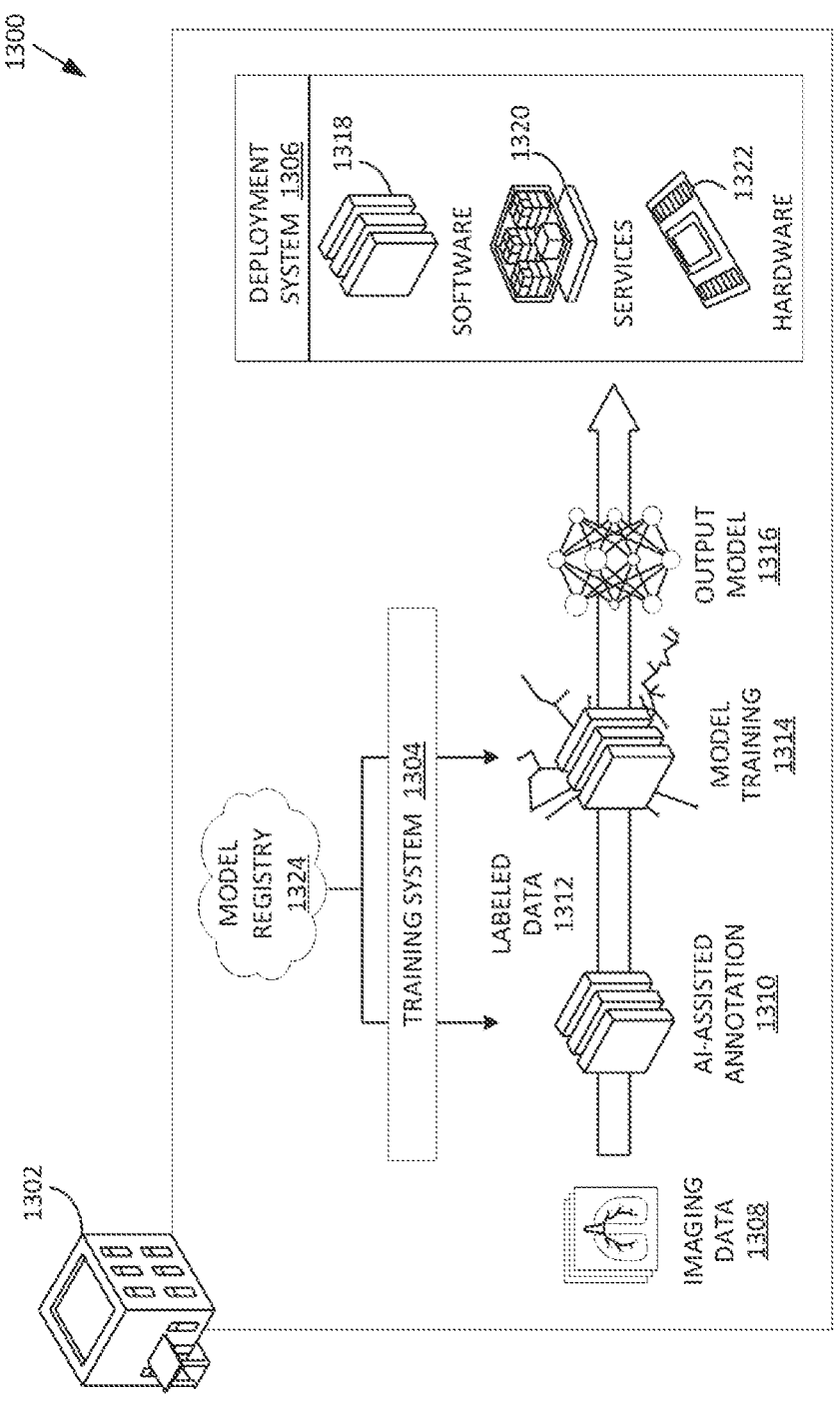
FIG. 13 illustrates an example data flow diagram for an advanced computing pipeline, in accordance with at least some embodiments.

FIG. 13 is an example data flow diagram for a process 1300 of generating and deploying an image processing and inferencing pipeline, in accordance with at least one embodiment. In at least one embodiment, process 1300 may be deployed for use with imaging devices, processing devices, and/or other device types at one or more facilities 1302. Process 1300 may be executed within a training system 1304 and/or a deployment system 1306. In at least one embodiment, training system 1304 may be used to perform training, deployment, and implementation of machine learning models (e.g., neural networks, object detection algorithms, computer vision algorithms, etc.) for use in deployment system 1306. In at least one embodiment, deployment system 1306 may be configured to offload processing and compute resources among a distributed computing environment to reduce infrastructure requirements at facility 1302. In at least one embodiment, one or more applications in a pipeline may use or call upon services (e.g., inference, visualization, compute, AI, etc.) of deployment system 1306 during execution of applications.

In at least one embodiment, some of applications used in advanced processing and inferencing pipelines may use machine learning models or other AI to perform one or more processing steps. In at least one embodiment, machine learning models may be trained at facility 1302 using data 1308 (such as imaging data) generated at facility 1302 (and stored on one or more picture archiving and communication system (PACS) servers at facility 1302), may be trained using imaging or sequencing data 1308 from another facility(ies), or a combination thereof. In at least one embodiment, training system 1304 may be used to provide applications, services, and/or other resources for generating working, deployable machine learning models for deployment system 1306.

In at least one embodiment, model registry 1324 may be backed by object storage that may support versioning and object metadata. In at least one embodiment, object storage may be accessible through, for example, a cloud storage (e.g., cloud 1426 of FIG. 14) compatible application programming interface (API) from within a cloud platform. In at least one embodiment, machine learning models within model registry 1324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1404 (FIG. 14) may include a scenario where facility 1302 is training their own machine learning model, or has an existing machine learning model that needs to be optimized or updated. In at least one embodiment, imaging data 1308 generated by imaging device(s), sequencing devices, and/or other device types may be received. In at least one embodiment, once imaging data 1308 is received, AI-assisted annotation 1310 may be used to aid in generating annotations corresponding to imaging data 1308 to be used as ground truth data for a machine learning model. In at least one embodiment, AI-assisted annotation 1310 may include one or more machine learning models (e.g., convolutional neural networks (CNNs)) that may be trained to generate annotations corresponding to certain types of imaging data 1308 (e.g., from certain devices). In at least one embodiment, AI-assisted annotations 1310 may then be used directly, or may be adjusted or fine-tuned using an annotation tool to generate ground truth data. In at least one embodiment, AI-assisted annotations 1310, labeled clinic data 1312, or a combination thereof may be used as ground truth data for training a machine learning model. In at least one embodiment, a trained machine learning model may be referred to as output model 1316, and may be used by deployment system 1306, as described herein.

In at least one embodiment, training pipeline 1404 (FIG. 14) may include a scenario where facility 1302 needs a machine learning model for use in performing one or more processing tasks for one or more applications in deployment system 1306, but facility 1302 may not currently have such a machine learning model (or may not have a model that is optimized, efficient, or effective for such purposes). In at least one embodiment, an existing machine learning model may be selected from a model registry 1324. In at least one embodiment, model registry 1324 may include machine learning models trained to perform a variety of different inference tasks on imaging data. In at least one embodiment, machine learning models in model registry 1324 may have been trained on imaging data from different facilities than facility 1302 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1324. In at least one embodiment, a machine learning model may then be retrained, or updated, at any number of other facilities, and a retrained or updated model may be made available in model registry 1324. In at least one embodiment, a machine learning model may then be selected from model registry 1324—and referred to as output model 1316—and may be used in deployment system 1306 to perform one or more processing tasks for one or more applications of a deployment system.

In at least one embodiment, training pipeline 1404 (FIG. 14), a scenario may include facility 1302 requiring a machine learning model for use in performing one or more processing tasks for one or more applications in deployment system 1306, but facility 1302 may not currently have such a machine learning model (or may not have a model that is optimized, efficient, or effective for such purposes). In at least one embodiment, a machine learning model selected from model registry 1324 may not be fine-tuned or optimized for imaging data 1308 generated at facility 1302 because of differences in populations, robustness of training data used to train a machine learning model, diversity in anomalies of training data, and/or other issues with training data. In at least one embodiment, AI-assisted annotation 1310 may be used to aid in generating annotations corresponding to imaging data 1308 to be used as ground truth data for retraining or updating a machine learning model. In at least one embodiment, labeled data 1312 may be used as ground truth data for training a machine learning model. In at least one embodiment, retraining or updating a machine learning model may be referred to as model training 1314. In at least one embodiment, model training 1314—e.g., AI-assisted annotations 1310, labeled clinic data 1312, or a combination thereof—may be used as ground truth data for retraining or updating a machine learning model. In at least one embodiment, a trained machine learning model may be referred to as output model 1316, and may be used by deployment system 1306, as described herein.

In at least one embodiment, deployment system 1306 may include software 1318, services 1320, hardware 1322, and/or other components, features, and functionality. In at least one embodiment, deployment system 1306 may include a software "stack," such that software 1318 may be built on top of services 1320 and may use services 1320 to perform some or all of processing tasks, and services 1320 and software 1318 may be built on top of hardware 1322 and use hardware 1322 to execute processing, storage, and/or other compute tasks of deployment system 1306. In at least one embodiment, software 1318 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1308, in addition to containers that receive and configure imaging data for use by each container and/or for use by facility 1302 after processing through a pipeline (e.g., to convert outputs back to a usable data type). In at least one embodiment, a combination of containers within software 1318 (e.g., that make up a pipeline) may be referred to as a virtual instrument (as described in more detail herein), and a virtual instrument may leverage services 1320 and hardware 1322 to execute some or all processing tasks of applications instantiated in containers.

In at least one embodiment, a data processing pipeline may receive input data (e.g., imaging data 1308) in a specific format in response to an inference request (e.g., a request from a user of deployment system 1306). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1316 of training system 1304.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1324 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1320 as a system (e.g., system 1400 of FIG. 14). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1400 (e.g., for accuracy), an application may be available in a container registry for selection and/or implementation by a user to perform one or more processing tasks with respect to data at a facility (e.g., a second facility) of a user.

Figure 14:
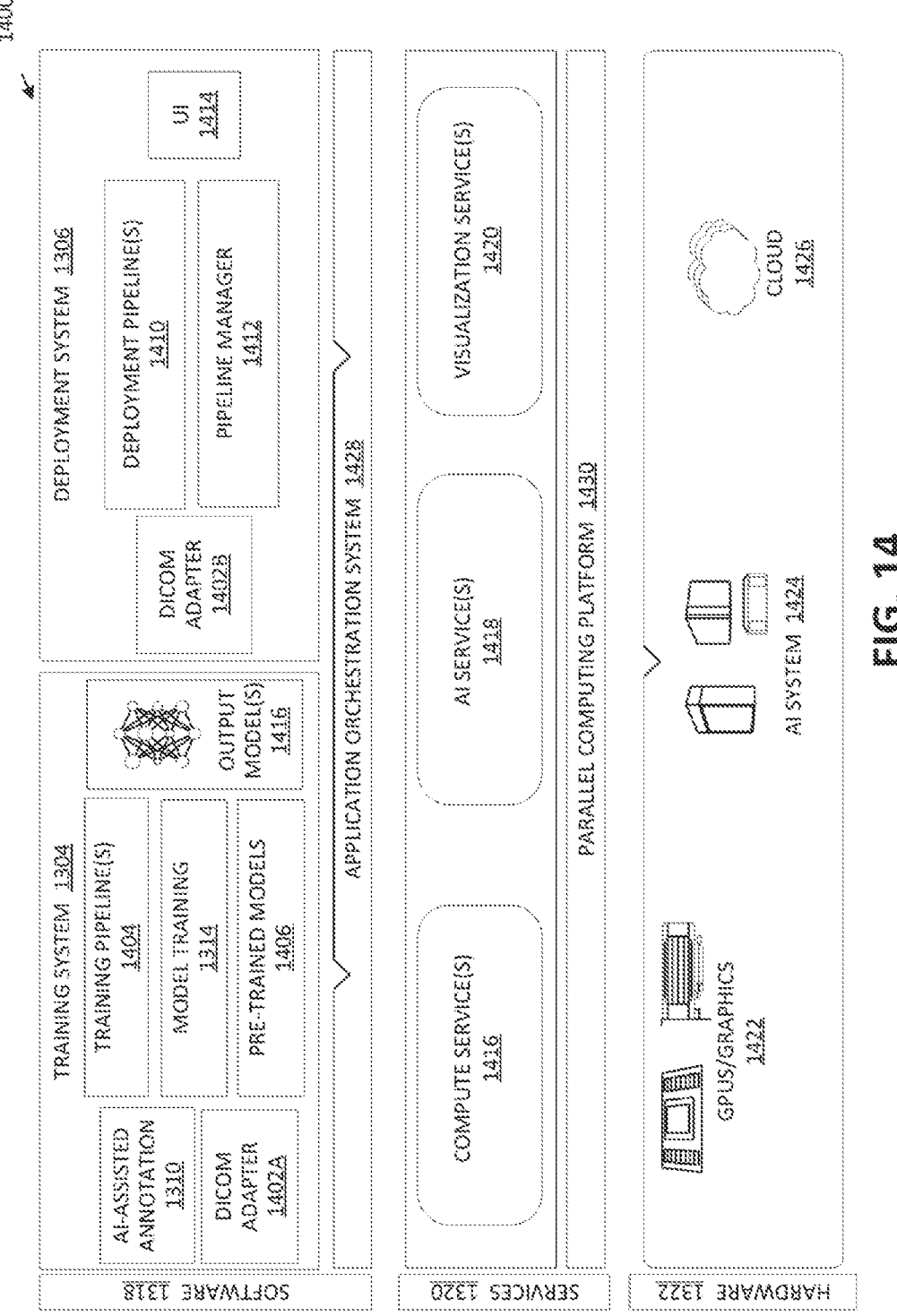
FIG. 14 illustrates a system diagram for an example system for training, adapting, instantiating and deploying machine learning models in an advanced computing pipeline, in accordance with at least some embodiment.

In at least one embodiment, developers may then share applications or containers through a network for access and use by users of a system (e.g., system 1400 of FIG. 14). In at least one embodiment, completed and validated applications or containers may be stored in a container registry and associated machine learning models may be stored in model registry 1324. In at least one embodiment, a requesting entity-who provides an inference or image processing request—may browse a container registry and/or model registry 1324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1306 (e.g., a cloud) to perform processing of data processing pipeline. In at least one embodiment, processing by deployment system 1306 may include referencing selected elements (e.g., applications, containers, models, etc.) from a container registry and/or model registry 1324. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1320 may be leveraged. In at least one embodiment, services 1320 may include compute services, artificial intelligence (AI) services, visualization services, and/or other service types. In at least one embodiment, services 1320 may provide functionality that is common to one or more applications in software 1318, so functionality may be abstracted to a service that may be called upon or leveraged by applications. In at least one embodiment, functionality provided by services 1320 may run dynamically and more efficiently, while also scaling well by allowing applications to process data in parallel (e.g., using a parallel computing platform 1430 (FIG. 14)). In at least one embodiment, rather than each application that shares a same functionality offered by a service 1320 being required to have a respective instance of service 1320, service 1320 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1320 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1318 implementing advanced processing and inferencing pipeline that includes segmentation application and anomaly detection application may be streamlined because each application may call upon a same inference service to perform one or more inferencing tasks.

In at least one embodiment, hardware 1322 may include GPUs, CPUs, DPUs, graphics cards, an AI/deep learning system (e.g., an AI supercomputer, such as NVIDIA's DGX), a cloud platform, or a combination thereof. In at least one embodiment, different types of hardware 1322 may be used to provide efficient, purpose-built support for software 1318 and services 1320 in deployment system 1306. In at least one embodiment, use of GPU processing may be implemented for processing locally (e.g., at facility 1302), within an AI/deep learning system, in a cloud system, and/or in other processing components of deployment system 1306 to improve efficiency, accuracy, and efficacy of image processing and generation. In at least one embodiment, software 1318 and/or services 1320 may be optimized for GPU processing with respect to deep learning, machine learning, and/or high-performance computing, as non-limiting examples. In at least one embodiment, at least some of computing environment of deployment system 1306 and/or training system 1304 may be executed in a datacenter one or more supercomputers or high performance computing systems, with GPU optimized software (e.g., hardware and software combination of NVIDIA's DGX System). In at least one embodiment, hardware 1322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform may further include DPU processing to transmit data received over a network and/or through a network controller or other network interface directly to (e.g., a memory of) one or more GPU(s). In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 14 is a system diagram for an example system 1400 for generating and deploying an imaging deployment pipeline, in accordance with at least one embodiment. In at least one embodiment, system 1400 may be used to implement process 1300 of FIG. 13 and/or other processes including advanced processing and inferencing pipelines. In at least one embodiment, system 1400 may include training system 1304 and deployment system 1306. In at least one embodiment, training system 1304 and deployment system 1306 may be implemented using software 1318, services 1320, and/or hardware 1322, as described herein.

In at least one embodiment, system 1400 (e.g., training system 1304 and/or deployment system 1306) may implemented in a cloud computing environment (e.g., using cloud 1426). In at least one embodiment, system 1400 may be implemented locally with respect to a healthcare services facility, or as a combination of both cloud and local computing resources. In at least one embodiment, access to APIs in cloud 1426 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate between and among one another using any of a variety of different network types, including but not limited to local area networks (LANs) and/or wide area networks (WANs) via wired and/or wireless communication protocols. In at least one embodiment, communication between facilities and components of system 1400 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1304 may execute training pipelines 1404, similar to those described herein with respect to FIG. 13. In at least one embodiment, where one or more machine learning models are to be used in deployment pipelines 1410 by deployment system 1306, training pipelines 1404 may be used to train or retrain one or more (e.g. pre-trained) models, and/or implement one or more of pre-trained models 1406 (e.g., without a need for retraining or updating). In at least one embodiment, as a result of training pipelines 1404, output model(s) 1316 may be generated. In at least one embodiment, training pipelines 1404 may include any number of processing steps, such as but not limited to imaging data (or other input data) conversion or adaption In at least one embodiment, for different machine learning models used by deployment system 1306, different training pipelines 1404 may be used. In at least one embodiment, training pipeline 1404 similar to a first example described with respect to FIG. 13 may be used for a first machine learning model, training pipeline 1404 similar to a second example described with respect to FIG. 13 may be used for a second machine learning model, and training pipeline 1404 similar to a third example described with respect to FIG. 13 may be used for a third machine learning model. In at least one embodiment, any combination of tasks within training system 1304 may be used depending on what is required for each respective machine learning model. In at least one embodiment, one or more of machine learning models may already be trained and ready for deployment so machine learning models may not undergo any processing by training system 1304, and may be implemented by deployment system 1306.

In at least one embodiment, output model(s) 1316 and/or pre-trained model(s) 1406 may include any types of machine learning models depending on implementation or embodiment. In at least one embodiment, and without limitation, machine learning models used by system 1400 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In at least one embodiment, training pipelines 1404 may include AI-assisted annotation, as described in more detail herein with respect to at least FIG. 16B. In at least one embodiment, labeled data 1312 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1308 (or other data type used by machine learning models), there may be corresponding ground truth data generated by training system 1304. In at least one embodiment, AI-assisted annotation may be performed as part of deployment pipelines 1410; either in addition to, or in lieu of AI-assisted annotation included in training pipelines 1404. In at least one embodiment, system 1400 may include a multi-layer platform that may include a software layer (e.g., software 1318) of diagnostic applications (or other application types) that may perform one or more medical imaging and diagnostic functions. In at least one embodiment, system 1400 may be communicatively coupled to (e.g., via encrypted links) PACS server networks of one or more facilities. In at least one embodiment, system 1400 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1302). In at least one embodiment, applications may then call or execute one or more services 1320 for performing compute, AI, or visualization tasks associated with respective applications, and software 1318 and/or services 1320 may leverage hardware 1322 to perform processing tasks in an effective and efficient manner.

In at least one embodiment, deployment system 1306 may execute deployment pipelines 1410. In at least one embodiment, deployment pipelines 1410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 1410 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1410 depending on information desired from data generated by a device. In at least one embodiment, where detections of anomalies are desired from an MRI machine, there may be a first deployment pipeline 1410, and where image enhancement is desired from output of an MRI machine, there may be a second deployment pipeline 1410.

In at least one embodiment, an image generation application may include a processing task that includes use of a machine learning model. In at least one embodiment, a user may desire to use their own machine learning model, or to select a machine learning model from model registry 1324. In at least one embodiment, a user may implement their own machine learning model or select a machine learning model for inclusion in an application for performing a processing task. In at least one embodiment, applications may be selectable and customizable, and by defining constructs of applications, deployment, and implementation of applications for a particular user are presented as a more seamless user experience. In at least one embodiment, by leveraging other features of system 1400—such as services 1320 and hardware 1322—deployment pipelines 1410 may be even more user friendly, provide for easier integration, and produce more accurate, efficient, and timely results.

In at least one embodiment, deployment system 1306 may include a user interface 1414 (e.g., a graphical user interface, a web interface, etc.) that may be used to select applications for inclusion in deployment pipeline(s) 1410, arrange applications, modify, or change applications or parameters or constructs thereof, use and interact with deployment pipeline(s) 1410 during set-up and/or deployment, and/or to otherwise interact with deployment system 1306. In at least one embodiment, although not illustrated with respect to training system 1304, user interface 1414 (or a different user interface) may be used for selecting models for use in deployment system 1306, for selecting models for training, or retraining, in training system 1304, and/or for otherwise interacting with training system 1304.

In at least one embodiment, pipeline manager 1412 may be used, in addition to an application orchestration system 1428, to manage interaction between applications or containers of deployment pipeline(s) 1410 and services 1320 and/or hardware 1322. In at least one embodiment, pipeline manager 1412 may be configured to facilitate interactions from application to application, from application to service 1320, and/or from application or service to hardware 1322. In at least one embodiment, although illustrated as included in software 1318, this is not intended to be limiting, and in some examples (e.g., as illustrated in FIG. 12) pipeline manager 1412 may be included in services 1320. In at least one embodiment, application orchestration system 1428 (e.g., Kubernetes, DOCKER, etc.) may include a container orchestration system that may group applications into containers as logical units for coordination, management, scaling, and deployment. In at least one embodiment, by associating applications from deployment pipeline(s) 1410 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (e.g., based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1320 leveraged by and shared by applications or containers in deployment system 1306 may include compute services 1416, AI services 1418, visualization services 1420, and/or other service types. In at least one embodiment, applications may call (e.g., execute) one or more of services 1320 to perform processing operations for an application. In at least one embodiment, compute services 1416 may be leveraged by applications to perform super-computing or other high-performance computing (HPC) tasks. In at least one embodiment, compute service(s) 1416 may be leveraged to perform parallel processing (e.g., using a parallel computing platform 1430) for processing data through one or more of applications and/or one or more tasks of a single application, substantially simultaneously. In at least one embodiment, parallel computing platform 1430 (e.g., NVIDIA's CUDA) may enable general purpose computing on GPUs (GPGPU) (e.g., GPUs 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1418 may be leveraged to perform inferencing services for executing machine learning model(s) associated with applications (e.g., tasked with performing one or more processing tasks of an application). In at least one embodiment, AI services 1418 may leverage AI system 1424 to execute machine learning model(s) (e.g., neural networks, such as CNNs) for segmentation, reconstruction, object detection, feature detection, classification, and/or other inferencing tasks. In at least one embodiment, applications of deployment pipeline(s) 1410 may use one or more of output models 1316 from training system 1304 and/or other models of applications to perform inference on imaging data. In at least one embodiment, two or more examples of inferencing using application orchestration system 1428 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources (e.g., services 1320 and/or hardware 1322) based on priority paths for different inferencing tasks of AI services 1418.

In at least one embodiment, shared storage may be mounted to AI services 1418 within system 1400. In at least one embodiment, shared storage may operate as a cache (or other storage device type) and may be used to process inference requests from applications. In at least one embodiment, when an inference request is submitted, a request may be received by a set of API instances of deployment system 1306, and one or more instances may be selected (e.g., for best fit, for load balancing, etc.) to process a request. In at least one embodiment, to process a request, a request may be entered into a database, a machine learning model may be located from model registry 1324 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1412) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s) and/or DPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<12 min). In at least one embodiment, model execution times may be measured from requesting institution or entity and may include partner network traversal time, as well as execution on an inference service.

In at least one embodiment, transfer of requests between services 1320 and inference applications may be hidden behind a software development kit (SDK), and robust transport may be provided through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization services 1420 may be leveraged to generate visualizations for viewing outputs of applications and/or deployment pipeline(s) 1410. In at least one embodiment, GPUs 1422 may be leveraged by visualization services 1420 to generate visualizations. In at least one embodiment, rendering effects, such as raytracing, may be implemented by visualization services 1420 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1420 may include an internal visualizer, cinematics, and/or other rendering or image processing capabilities or functionality (e.g., ray tracing, rasterization, internal optics, etc.).

In at least one embodiment, hardware 1322 may include GPUs 1422, AI system 1424, cloud 1426, and/or any other hardware used for executing training system 1304 and/or deployment system 1306. In at least one embodiment, GPUs 1422 (e.g., NVIDIA's TESLA and/or QUADRO GPUs) may include any number of GPUs that may be used for executing processing tasks of compute services 1416, AI services 1418, visualization services 1420, other services, and/or any of features or functionality of software 1318. For example, with respect to AI services 1418, GPUs 1422 may be used to perform pre-processing on imaging data (or other data types used by machine learning models), post-processing on outputs of machine learning models, and/or to perform inferencing (e.g., to execute machine learning models). In at least one embodiment, cloud 1426, AI system 1424, and/or other components of system 1400 may use GPUs 1422. In at least one embodiment, cloud 1426 may include a GPU-optimized platform for deep learning tasks. In at least one embodiment, AI system 1424 may use GPUs, and cloud 1426—or at least a portion tasked with deep learning or inferencing—may be executed using one or more AI systems 1424. As such, although hardware 1322 is illustrated as discrete components, this is not intended to be limiting, and any components of hardware 1322 may be combined with, or leveraged by, any other components of hardware 1322.

In at least one embodiment, AI system 1424 may include a purpose-built computing system (e.g., a super-computer or an HPC) configured for inferencing, deep learning, machine learning, and/or other artificial intelligence tasks. In at least one embodiment, AI system 1424 (e.g., NVIDIA's DGX) may include GPU-optimized software (e.g., a software stack) that may be executed using a plurality of GPUs 1422, in addition to DPUs, CPUs, RAM, storage, and/or other components, features, or functionality. In at least one embodiment, one or more AI systems 1424 may be implemented in cloud 1426 (e.g., in a data center) for performing some or all of AI-based processing tasks of system 1400.

In at least one embodiment, cloud 1426 may include a GPU-accelerated infrastructure (e.g., NVIDIA's NGC) that may provide a GPU-optimized platform for executing processing tasks of system 1400. In at least one embodiment, cloud 1426 may include an AI system(s) 1424 for performing one or more of AI-based tasks of system 1400 (e.g., as a hardware abstraction and scaling platform). In at least one embodiment, cloud 1426 may integrate with application orchestration system 1428 leveraging multiple GPUs to enable seamless scaling and load balancing between and among applications and services 1320. In at least one embodiment, cloud 1426 may tasked with executing at least some of services 1320 of system 1400, including compute services 1416, AI services 1418, and/or visualization services 1420, as described herein. In at least one embodiment, cloud 1426 may perform small and large batch inference (e.g., executing NVIDIA's TENSOR RT), provide an accelerated parallel computing API and platform 1430 (e.g., NVIDIA's CUDA), execute application orchestration system 1428 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1400.

Figure 15A:
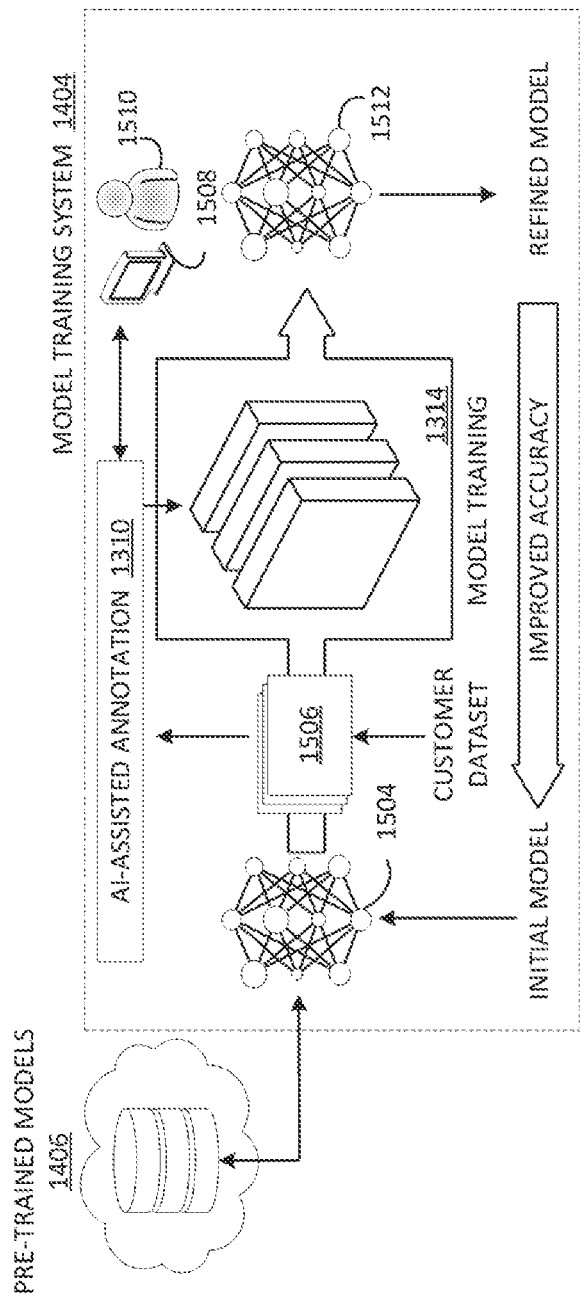
FIGS. 15A and 15B illustrate a data flow diagram for a process to train a machine learning model, as well as client-server architecture to enhance annotation tools with pre-trained annotation models, in accordance with at least some embodiments.

FIG. 15A illustrates a data flow diagram for a process 1500 to train, retrain, or update a machine learning model, in accordance with at least one embodiment. In at least one embodiment, process 1500 may be executed using, as a non-limiting example, system 1400 of FIG. 14. In at least one embodiment, process 1500 may leverage services 1320 and/or hardware 1322 of system 1400, as described herein. In at least one embodiment, refined models 1512 generated by process 1500 may be executed by deployment system 1306 for one or more containerized applications in deployment pipelines 1410.

In at least one embodiment, model training 1314 may include retraining or updating an initial model 1504 (e.g., a pre-trained model) using new training data (e.g., new input data, such as customer dataset 1506, and/or new ground truth data associated with input data). In at least one embodiment, to retrain, or update, initial model 1504, output or loss layer(s) of initial model 1504 may be reset, or deleted, and/or replaced with an updated or new output or loss layer(s). In at least one embodiment, initial model 1504 may have previously fine-tuned parameters (e.g., weights and/or biases) that remain from prior training, so training or retraining 1314 may not take as long or require as much processing as training a model from scratch. In at least one embodiment, during model training 1314, by having reset or replaced output or loss layer(s) of initial model 1504, parameters may be updated and re-tuned for a new data set based on loss calculations associated with accuracy of output or loss layer(s) at generating predictions on new, customer dataset 1506 (e.g., image data 1308 of FIG. 13).

In at least one embodiment, pre-trained models 1406 may be stored in a data store, or registry (e.g., model registry 1324 of FIG. 13). In at least one embodiment, pre-trained models 1406 may have been trained, at least in part, at one or more facilities other than a facility executing process 1500. In at least one embodiment, to protect privacy and rights of patients, subjects, or clients of different facilities, pre-trained models 1406 may have been trained, on-premise, using customer or patient data generated on-premise. In at least one embodiment, pre-trained models 1406 may be trained using cloud 1426 and/or other hardware 1322, but confidential, privacy protected patient data may not be transferred to, used by, or accessible to any components of cloud 1426 (or other off premise hardware). In at least one embodiment, where a pre-trained model 1406 is trained at using patient data from more than one facility, pre-trained model 1406 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1406 on-premise and/or off premise, such as in a datacenter or other cloud computing infrastructure.

In at least one embodiment, when selecting applications for use in deployment pipelines 1410, a user may also select machine learning models to be used for specific applications. In at least one embodiment, a user may not have a model for use, so a user may select a pre-trained model 1406 to use with an application. In at least one embodiment, pre-trained model 1406 may not be optimized for generating accurate results on customer dataset 1506 of a facility of a user (e.g., based on patient diversity, demographics, types of medical imaging devices used, etc.). In at least one embodiment, prior to deploying pre-trained model 1406 into deployment pipeline 1410 for use with an application(s), pre-trained model 1406 may be updated, retrained, and/or fine-tuned for use at a respective facility.

In at least one embodiment, a user may select pre-trained model 1406 that is to be updated, retrained, and/or fine-tuned, and pre-trained model 1406 may be referred to as initial model 1504 for training system 1304 within process 1500. In at least one embodiment, customer dataset 1506 (e.g., imaging data, genomics data, sequencing data, or other data types generated by devices at a facility) may be used to perform model training 1314 (which may include, without limitation, transfer learning) on initial model 1504 to generate refined model 1512. In at least one embodiment, ground truth data corresponding to customer dataset 1506 may be generated by training system 1304. In at least one embodiment, ground truth data may be generated, at least in part, by clinicians, scientists, doctors, practitioners, at a facility (e.g., as labeled clinic data 1312 of FIG. 13).

In at least one embodiment, AI-assisted annotation 1310 may be used in some examples to generate ground truth data. In at least one embodiment, AI-assisted annotation 1310 (e.g., implemented using an AI-assisted annotation SDK) may leverage machine learning models (e.g., neural networks) to generate suggested or predicted ground truth data for a customer dataset. In at least one embodiment, user 1510 may use annotation tools within a user interface (a graphical user interface (GUI)) on computing device 1508.

In at least one embodiment, user 1510 may interact with a GUI via computing device 1508 to edit or fine-tune (auto) annotations. In at least one embodiment, a polygon editing feature may be used to move vertices of a polygon to more accurate or fine-tuned locations.

In at least one embodiment, once customer dataset 1506 has associated ground truth data, ground truth data (e.g., from AI-assisted annotation, manual labeling, etc.) may be used by during model training 1314 to generate refined model 1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines 1410 at a facility for performing one or more processing tasks with respect to medical imaging data.

In at least one embodiment, refined model 1512 may be uploaded to pre-trained models 1406 in model registry 1324 to be selected by another facility. In at least one embodiment, his process may be completed at any number of facilities such that refined model 1512 may be further refined on new datasets any number of times to generate a more universal model.

Figure 15B:
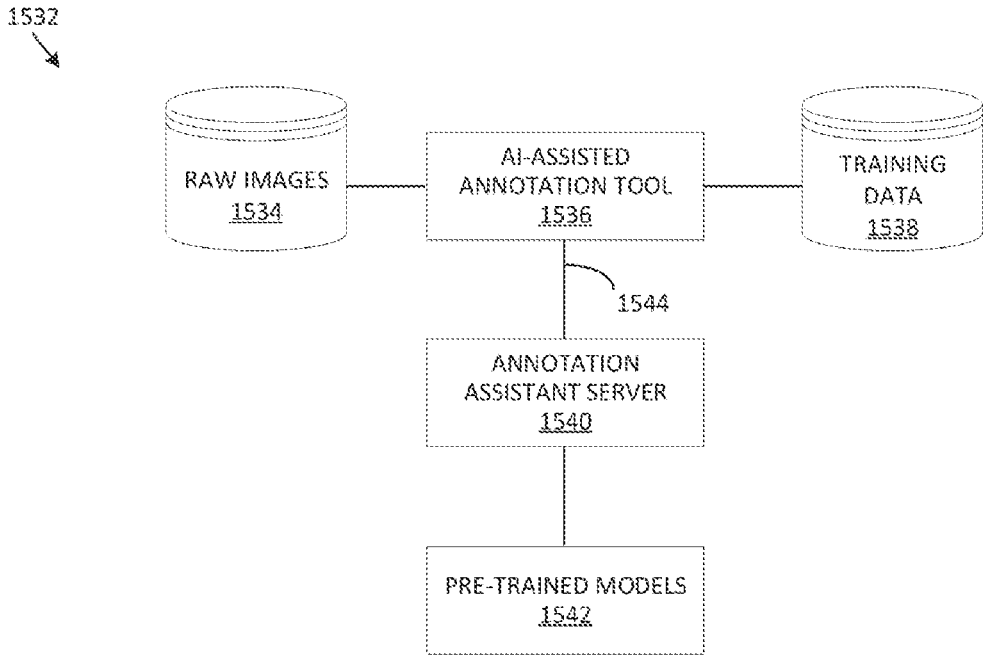

FIG. 15B is an example illustration of a client-server architecture 1532 to enhance annotation tools with pre-trained annotation models, in accordance with at least one embodiment. In at least one embodiment, AI-assisted annotation tools 1536 may be instantiated based on a client-server architecture 1532. In at least one embodiment, annotation tools 1536 in imaging applications may aid radiologists, for example, identify organs and abnormalities. In at least one embodiment, imaging applications may include software tools that help user 1510 to identify, as a non-limiting example, a few extreme points on a particular organ of interest in raw images 1534 (e.g., in a 3D MRI or CT scan) and receive auto-annotated results for all 2D slices of a particular organ. In at least one embodiment, results may be stored in a data store as training data 1538 and used as (for example and without limitation) ground truth data for training. In at least one embodiment, when computing device 1508 sends extreme points for AI-assisted annotation 1310, a deep learning model, for example, may receive this data as input and return inference results of a segmented organ or abnormality. In at least one embodiment, pre-instantiated annotation tools, such as AI-Assisted Annotation Tool 1536B in FIG. 15B, may be enhanced by making API calls (e.g., API Call 1544) to a server, such as an Annotation Assistant Server 1540 that may include a set of pre-trained models 1542 stored in an annotation model registry, for example. In at least one embodiment, an annotation model registry may store pre-trained models 1542

(e.g., machine learning models, such as deep learning models) that are pre-trained to perform AI-assisted annotation on a particular organ or abnormality. These models may be further updated by using training pipelines 1404. In at least one embodiment, pre-installed annotation tools may be improved over time as new labeled clinic data 1312 is added.

Such components may be used to generate synthetic data imitating failure cases in a network training process, which may help to improve performance of the network while limiting the amount of synthetic data to avoid overfitting.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

50

What is claimed is:

1. A method comprising:

allocating, using an application hosting platform, a virtualized computing environment for execution of an application hosted by the application hosting platform;

sending, using the application hosting platform, a pre-load request to the virtualized computing environment that causes the virtualized computing environment to pre-load a first portion of data for the application, wherein the pre-load request is sent before receiving a user request to execute the application;

receiving, at the application hosting platform from the virtualized computing environment, a first indication that the first portion of data is pre-loaded in the virtualized computing environment, wherein receiving the first indication transitions the virtualized computing environment to an idle mode as the pre-load is done and prior to receiving the user request to execute the application;

receiving, at the application hosting platform, the user request to execute the application;

sending, using the application hosting platform, the user request to the virtualized computing environment that causes the virtualized computing environment to load a second portion of data;

receiving, at the application hosting platform, a second indication that the second portion of data is loaded in the virtualized computing environment for the application to be executed; and in response to receiving the second indication, causing the application to be executed using the virtualized computing environment.

2. The method of claim 1, wherein the first portion of data comprises application data that is common to a plurality of users, and the second portion of data comprises user-specific data.

3. The method of claim 1, further comprising:

sending, using the application hosting platform, a plurality of pre-load requests to pre-load the first portion of data for the application at a plurality of virtualized computing environments, the plurality of pre-load requests being received before receiving user input identifying the application for execution; and receiving, using the application hosting platform, a third indication that the first portion of data is pre-loaded for the application at the plurality of virtualized computing environments.

4. The method of claim 3, further comprising:

receiving, using the application hosting platform, a second user request to execute the application running at a second virtualized computing environment of the plurality of virtualized computing environments;

sending, using the application hosting platform, a second load request to load the second portion of data for the application into the second virtualized computing environment;

receiving, using the application hosting platform, a fourth indication that the second portion of data is loaded for the application into the second virtualized computing environment; and causing the application to execute at the second virtualized computing environment in response to receiving the fourth indication.

5. The method of claim 2, further comprising:

determining a number of virtualized computing environments to pre-load based on an average duration for which the virtualized computing environment is idle.

6. The method of claim 1, wherein pre-loading the application is requested using a command line interface (CLI) command or a flag in a configuration file of the application.

7. The method of claim 1, further comprising:

predicting that the first portion of data is pre-loaded for the application at the virtualized computing environment using a machine learning model trained based at least in part on previous durations to pre-load the first portion of data for the application at one or more virtualized computing environments.

8. The method of claim 1, further comprising:

receiving, using the application, an indication that one or more files associated with the application were updated; and causing the virtualized computing environment to be deconstructed in response to receiving the indication that the one or more files associated with the application were updated.

9. A system comprising:

an application hosting platform to:

request allocation of a virtualized computing environment to launch an application hosted at the application hosting platform in a pre-load mode before receiving user input identifying the application for execution, wherein the pre-load mode is associated with pre-loading a first portion of data for the application;

receive, from the virtualized computing environment, a first indication that the virtualized computing environment has been allocated for the application;

transmit instructions to launch the application in the pre-load mode at the virtualized computing environment in response to the first indication;

receive a second indication that the first portion of data is loaded into the virtualized computing environment; and causing the virtualized computing environment to be transitioned to an idle state in response to receiving the second indication, wherein the virtualized computing environment transitions to the idle state as the pre-load mode is done and prior to receiving the user input identifying the application for execution.

10. The system of claim 9, wherein the application hosting platform is further to:

receive a request to execute the application at the virtualized computing environment, wherein the request is associated with user input identifying the application for execution; and transmit second instructions to load a second portion of data for the application into the virtualized computing environment.

11. The system of claim 10, wherein the application hosting platform is further to:

receive a third indication that the second portion of data is loaded into the virtualized computing environment; and causing the application to execute at the virtualized computing environment in response to receiving the third indication.

12. The system of claim 10, wherein the application hosting platform is further to:

access an account associated with the user input in response to receiving the request to execute the application at the virtualized computing environment, the account comprising the second portion of data.

13. The system of claim 9, wherein the application is instructed to launch in the pre-load mode using a command line interface (CLI) command or a flag in a configuration file of the application.

14. The system of claim 9, wherein the application hosting platform is further to:

receive an initialization sequence before allocating the virtualized computing environment; and receive the second indication that the first portion of data is loaded into the virtualized computing environment after receiving the initialization sequence based on the application executing in a cloud environment.

15. The system of claim 9, wherein the application hosting platform is further to:

determine that a number of user inputs associated with the application is greater than a number of virtualized computing environments on which the application is launched, wherein allocating the virtualized computing environment is based on determining that the number of user inputs is greater than the number of virtualized computing environments.

16. The system of claim 9, wherein the application comprises at least one of:

a gaming application;

a video conferencing application;

a content creation application;

a cloud-hosted application;

a collaborative content creation application;

a cloud-hosted collaborative content creation application;

a video streaming application;

a machine learning application; or a simulation application.

17. The system of claim 9, wherein the application hosting platform comprises at least one of:

a cloud-hosted gaming service platform;

a cloud-hosted collaborative content creation platform for heterogeneous content creation applications;

a video streaming hosting platform;

a testing platform for simulated or augmented content;

a machine learning training platform;

a machine learning deployment platform; or a video conferencing hosting platform.

18. A non-transitory computer-readable medium storing instructions thereon, wherein the instructions, when executed by a processing device, cause the processing device to:

allocate, using an application hosting platform, a virtualized computing environment for execution of an application hosted by the application hosting platform;

send, using the application hosting platform, a pre-load request to the virtualized computing environment that causes the virtualized computing environment to pre-load a first portion of data for the application, wherein the pre-load request is sent before receiving a user request to execute the application;

receive, at the application hosting platform from the virtualized computing environment, a first indication that the first portion of data is pre-loaded in the virtualized computing environment, wherein receiving the first indication transitions the virtualized computing environment to an idle mode as the pre-load is done and prior to receiving the user request to execute the application;

receive, at the application hosting platform, the user request to execute the application;

send, using the application hosting platform, the user request to the virtualized computing environment that causes the virtualized computing environment to load a second portion of data;

receive, at the application hosting platform, a second indication that the second portion of data is loaded in the virtualized computing environment for the application to be executed; and in response to receiving the second indication, cause the application to be executed using the virtualized computing environment.

19. The non-transitory computer-readable medium of claim 18, wherein the first portion of data comprises application data that is common to a plurality of users, and the second portion of data comprises user-specific data.

20. The non-transitory computer-readable medium of claim 18, wherein the instructions, when executed by the processing device, cause the processing device further to:

send a plurality of pre-load requests to pre-load the first portion of data for the application using a plurality of virtualized computing environments, the plurality of pre-load requests being received before receiving user input identifying the application for execution; and receive a third indication that the first portion of data is pre-loaded for the application at the plurality of virtualized computing environments.

21. The non-transitory computer-readable medium of claim 20, wherein the instructions, when executed by a processing device, cause the processing device further to:

receive a second user request to execute the application using a second virtualized computing environment of the plurality of virtualized computing environments;

send a second load request to load the second portion of data for the application into the second virtualized computing environment;

receive a fourth indication that the second portion of data is loaded for the application using the second virtualized computing environment; and cause the application to execute using the second virtualized computing environment in response to receiving the fourth indication.

* * * * *